(12) United States Patent
Wait et al.

(10) Patent No.: US 12,195,067 B2
(45) Date of Patent: Jan. 14, 2025

(54) REAL-TIME CONTROL OF OFF-LINING OF LOCOMOTIVES FOR ENERGY MANAGEMENT

(71) Applicant: Progress Rail Services Corporation, Albertville, AL (US)

(72) Inventors: Keith Wesley Wait, Flower Mound, TX (US); Marcos Blanco Fernandes, Irving, TX (US)

(73) Assignee: Progress Rail Services Corporation, Albertville, AL (US)

( * ) Notice: Subject to any disclaimer, the term of this patent is extended or adjusted under 35 U.S.C. 154(b) by 15 days.

(21) Appl. No.: 18/081,022

(22) Filed: Dec. 14, 2022

(65) Prior Publication Data

US 2024/0199101 A1  Jun. 20, 2024

(51) Int. Cl.
*B61L 27/60* (2022.01)
*B61C 17/12* (2006.01)
*B61L 27/04* (2006.01)
*B61L 27/40* (2022.01)

(52) U.S. Cl.
CPC .............. *B61L 27/60* (2022.01); *B61C 17/12* (2013.01); *B61L 27/04* (2013.01); *B61L 27/40* (2022.01)

(58) Field of Classification Search
CPC .......... B61L 27/04; B61L 27/60; B61L 27/20; B61L 27/70; B61L 15/0018; B61L 2201/00; B61C 3/02; B61C 7/04; B61C 17/06; G06N 3/08
USPC ......................................................... 701/19
See application file for complete search history.

(56) References Cited

U.S. PATENT DOCUMENTS

| | | | |
|---|---|---|---|
| 7,021,588 B2 | 4/2006 | Hess, Jr. et al. | |
| 8,924,052 B2 | 12/2014 | Melas et al. | |
| 9,079,589 B2 | 7/2015 | Cooper et al. | |
| 9,114,812 B2 | 8/2015 | Frazier et al. | |
| 9,156,477 B2 | 10/2015 | Cooper et al. | |

(Continued)

FOREIGN PATENT DOCUMENTS

| | | |
|---|---|---|
| DE | 102004040351 A1 | 3/2006 |
| EP | 2437968 B1 | 4/2019 |
| WO | 2020043397 A1 | 3/2020 |

OTHER PUBLICATIONS

Written Opinion and International Search Report for Int'l. Patent Appln. No. PCT/US2023/080259, mailed Mar. 14, 2024 (15 pgs).

*Primary Examiner* — Yi-Kai Wang

(57) ABSTRACT

A method of controlling one or more locomotives in a train includes using a machine learning engine and a virtual system modeling engine to model and classify sections of track along which the train is traveling according to the tractive power needs for the train traversing each section of track as a function of an effective weight profile for the train in the section and an effective friction profile for the train in the section of track. The method includes using the results of the effective weight profile, the effective friction profile, and an effective power availability profile to train the virtual system modeling engine using the machine learning engine to model designated areas of the track where the total tractive effort force or dynamic braking force applied by all of the locomotives in the train is less than a tractive effort force or dynamic braking force, respectively, that can be provided by a subset of the available locomotives in the train.

20 Claims, 4 Drawing Sheets

(56) References Cited

U.S. PATENT DOCUMENTS

| | | | |
|---|---|---|---|
| 9,266,542 B2 | 2/2016 | Daum et al. | |
| 9,327,741 B2 | 5/2016 | Golden et al. | |
| 10,032,111 B1* | 7/2018 | Bertram | G09B 9/16 |
| 2003/0213875 A1* | 11/2003 | Hess, Jr. | B61L 25/028 |
| | | | 246/167 R |
| 2005/0253397 A1* | 11/2005 | Kumar | B61C 15/10 |
| | | | 291/2 |
| 2009/0177344 A1* | 7/2009 | James | B61L 27/20 |
| | | | 701/19 |
| 2020/0385034 A1* | 12/2020 | Yang | H02J 7/1438 |
| 2022/0194440 A1 | 6/2022 | Akif et al. | |

* cited by examiner

REAL-TIME CONTROL OF OFF-LINING OF LOCOMOTIVES FOR ENERGY MANAGEMENT

TECHNICAL FIELD

The present disclosure relates generally to energy management in a train and, more particularly, to real-time control of off-lining of locomotives based on power needs for the train.

BACKGROUND

A train may include one or more consists or groups of locomotives, and additional non-powered rail cars, with a lead consist and one or more trailing consists. A consist often includes a lead locomotive and at least one trailing locomotive. The lead locomotive, although generally located at the leading end of the consist, can alternatively be located at any other position along its length. The lead locomotive generates operator and/or autonomous control commands directed to components of the lead and trailing locomotives. A typical locomotive of a consist will have a prime mover power source that includes a diesel engine and an alternator or generator that converts rotational output of the diesel engine into electrical power. The term "prime mover" is generally used to refer to the source of power used primarily for generating a tractive effort used in moving the vehicle. A prime mover power source may also provide power for parasitic or auxiliary loads that do not contribute to the tractive effort, such as air compressors, traction motor blowers, and radiator fans. In some cases an additional auxiliary power source is included on the locomotive to provide the power needed for parasitic or auxiliary loads. Electrical power output by the prime mover power source is used primarily to drive electric traction motors, which convert the electrical power back into rotational output that drives the axles and wheels of the locomotive. A typical locomotive may have two trucks that support the body of the locomotive, with each truck including two or three axles, and each axle being driven by one of the electric traction motors.

Tractive power for the locomotive is supplied by the traction motors. Each traction motor may be an alternating current (AC) traction motor or a direct current (DC) traction motor. The diesel engine drives an alternator/rectifier that provides the prime mover electrical power to an electrical power bus. The prime mover electrical power from the alternator/rectifier is DC power that is then converted to provide electrical power in the appropriate form for the traction motors. When AC traction motors are used, one or more inverters receive the prime mover DC electrical power from the electrical power bus and supply AC power to one or a plurality of locomotive traction motors to propel the locomotive. When DC traction motors are used, DC chopper circuits receive a constant DC electrical power from the electrical power bus on the same locomotive and convert this constant DC electrical power into a variable DC electrical power source appropriate for each DC traction motor. The conversion of DC electrical power for use by DC traction motors includes using a switching technique known as pulse width modulation (PWM). Each of the locomotive traction motors on a locomotive propel the locomotive in response to the prime mover electrical power.

Communication between the lead and trailing locomotives can involve a hard-wired multi-unit (MU) cable, which extends along the length of the consist. An MU cable may include many wires, each capable of carrying a discrete signal used to regulate a different aspect of consist operation. Some of the wires may carry signals indicative of a desired power level for the consist. The MU cable includes several wires that carry signals indicative of different throttle notch settings (predefined discrete power levels). Most of these signals are binary indicators that either provide a voltage or no voltage to the wires. Known methods for controlling a consist of at least first and second locomotives include providing control signals from a lead locomotive over the MU cable to command discrete operating modes for each locomotive in a consist. Such a method is disclosed in U.S. Pat. No. 7,021,588 that issued to Hess, Jr. et al. on Apr. 4, 2006 ("the '588 patent"). The method in the '588 patent includes receiving a control command and determining a power operating mode of the first locomotive and a power operating mode of at least the second locomotive as a function of the control command and an optimization parameter.

Although the system of the '588 patent may have improved communication between multiple locomotives in a consist, the system may still be problematic. In particular, the system may be limited to communicating power operating requirements and control signals to each locomotive in a consist, but without the capability of remotely designating a different operational status for one or more of the locomotives based on real-time changes to power needs for maintaining speed limits of the train for improved overall consist fuel efficiency and other parameters.

The system and method of the present disclosure solves one or more of the problems set forth above and/or other problems in the art.

SUMMARY

In one aspect, the present disclosure is directed to a method of controlling one or more locomotives in a train. The method may include using a machine learning engine and a virtual system modeling engine to model and classify sections of track along which the train is traveling according to the tractive power needs for the train traversing each section of track as a function of an effective weight profile for the train in the section and an effective friction profile for the train in the section of track. The method may include acquiring a first set of real-time and historical data relating to grade vs. location for the section of track and a first set of corresponding structural information on each of the one or more locomotives and on non-powered rail cars of the train traveling over the section of track, and calculating the effective weight profile for the train in the section of track using the first set of real-time and historical data and the first set of corresponding structural information. The method may further include acquiring a second set of real-time and historical data relating to speed of the train vs. location for the section of track and a second set of corresponding structural information on each of the one or more locomotives and on non-powered rail cars of the train traveling over the section of track, and calculating the effective friction profile for the train in the section of track using the second set of real-time and historical data and the second set of corresponding structural information. The method may still further include acquiring a third set of real-time and historical data relating to a tractive effort force vs. speed and dynamic braking force for each of the one or more locomotives traveling over the section of track, and calculating the effective power availability profile for the train in the section of track using the third set of real-time and historical data.

The method includes using the effective weight profile, the effective friction profile, and the effective power availability profile to train a virtual system modeling engine using the machine learning engine to model designated areas of the track where the total tractive effort force or dynamic braking force applied by all of the locomotives in the train is less than a tractive effort force or dynamic braking force, respectively, that can be provided by a subset of the available locomotives in the train for a time duration greater than the time needed to power down and power back up one or more unneeded locomotives or consists of locomotives in the train. The method still further includes storing one or more virtual system models simulated by the virtual system modeling engine in a model database, wherein each of the one or more virtual system models includes a mapping between different combinations of the first, second, and third sets of real-time and historical data and corresponding designated areas of the track, and acting, using an energy management system associated with one or more locomotives of the train, to off-line the one or more unneeded locomotives or consists of locomotives for the time duration based at least in part on one of the virtual system models.

In another aspect, the present disclosure is directed to a train control system using a machine learning engine and a virtual system modeling engine for controlling one or more locomotives in a train by modeling and classifying sections of track along which the train is traveling according to tractive power needs for the train traversing each section of track as a function of an effective weight profile of the train in the section of track and an effective friction profile of the train in the section of track. The train control system may include an effective weight module programmed to acquire a first set of real-time and historical data relating to grade vs. location for the section of track and a first set of corresponding structural information on each of the one or more locomotives and on non-powered rail cars of the train traveling over the section of track, and calculate the effective weight profile of the train in the section of track using the first set of real-time and historical data and the first set of corresponding structural information. The train control system may further include an effective friction module programmed to acquire a second set of real-time and historical data relating to speed of the train vs. location for the section of track and a second set of corresponding structural information on each of the one or more locomotives and on non-powered rail cars of the train traveling over the section of track, and calculate the effective friction profile of the train in the section of track using the second set of real-time and historical data and the second set of corresponding structural information. The train control system may still further include a power availability module programmed to acquire a third set of real-time and historical data relating to a tractive effort force vs. speed and a dynamic braking force for each of the one or more locomotives traveling over the section of track, and calculate the effective power availability profile of the train in the section of track using the third set of real-time and historical data. The train control system may include a virtual system modeling engine programmed to combine the results of the effective weight profile, the effective friction profile, and the effective power availability profile, and use the combined data and the machine learning engine to train one or more virtual system models to recognize designated areas of the track where the total tractive effort force or dynamic braking force applied by all of the locomotives in the train is less than the tractive effort force or dynamic braking force, respectively, that can be provided by a subset of the available locomotives in the train for a time duration greater than the time needed to power down and power back up one or more unneeded locomotives or consists of locomotives in the train. The train control system still further includes memory for storing the one or more virtual system models simulated by the virtual system modeling engine, wherein each of the one or more virtual system models includes a mapping between different combinations of the first, second, and third sets of real-time and historical data and corresponding designated areas of the track, and an energy management system associated with one or more locomotives of the train and configured to off-line the one or more unneeded locomotives or consists of locomotives for the time duration based at least in part on one of the virtual system models.

In yet another aspect, the present disclosure is directed to a locomotive control system that includes a machine learning engine. The machine learning system may be configured to receive real-time and historical data for use as training data for a virtual system modeling engine configured to model and classify sections of track along which one or more locomotives of a train are traveling according to the tractive power needs for the train traversing each section of track as a function of an effective weight profile of the train in the section and an effective friction profile of the train in the section of track. The machine learning engine may include an effective weight module programmed to acquire a first set of real-time and historical data relating to grade vs. location for each of the sections of track and a first set of corresponding structural information on each of the one or more locomotives and on non-powered rail cars of the train traveling over each section of track, and calculate the effective weight profile of the train in each section of track using the first set of real-time and historical data and the first set of corresponding structural information. The machine learning engine may further include an effective friction module programmed to acquire a second set of real-time and historical data relating to speed of the train vs. location for each of the sections of track and a second set of corresponding structural information on each of the one or more locomotives and on non-powered rail cars of the train traveling over each section of track, and calculate the effective friction profile of the train in each section of track using the second set of real-time and historical data and the second set of corresponding structural information. The machine learning engine may still further include a power availability module programmed to acquire a third set of real-time and historical data relating to the tractive effort force vs. speed and dynamic braking force for each of the one or more locomotives traveling over each section of track, and calculate the effective power availability profile of the train in each section of track using the third set of real-time and historical data. The virtual system modeling engine may be programmed to combine the results of the effective weight profile, the effective friction profile, and the effective power availability profile, and use the combined data to generate one or more virtual system models identifying designated areas of the track where the total tractive effort force or dynamic braking force applied by all of the locomotives in the train is less than the tractive effort force or dynamic braking force, respectively, that can be provided by a subset of the available locomotives in the train for a time duration greater than the time needed to power down and power back up one or more unneeded locomotives or consists of locomotives in the train. The locomotive control system may still further include memory for storing the one or more virtual system models simulated by the virtual system modeling engine, wherein each of the one or more virtual system models includes a mapping between different combinations of the first, second, and third sets of real-time and historical data and corresponding designated areas of the track, and an energy management system associated with one or more locomotives of the train and configured to isolate the one or more unneeded locomotives or consists of locomotives for the time duration based at least in part on one of the virtual system models.

DETAILED DESCRIPTION

Figure 1:
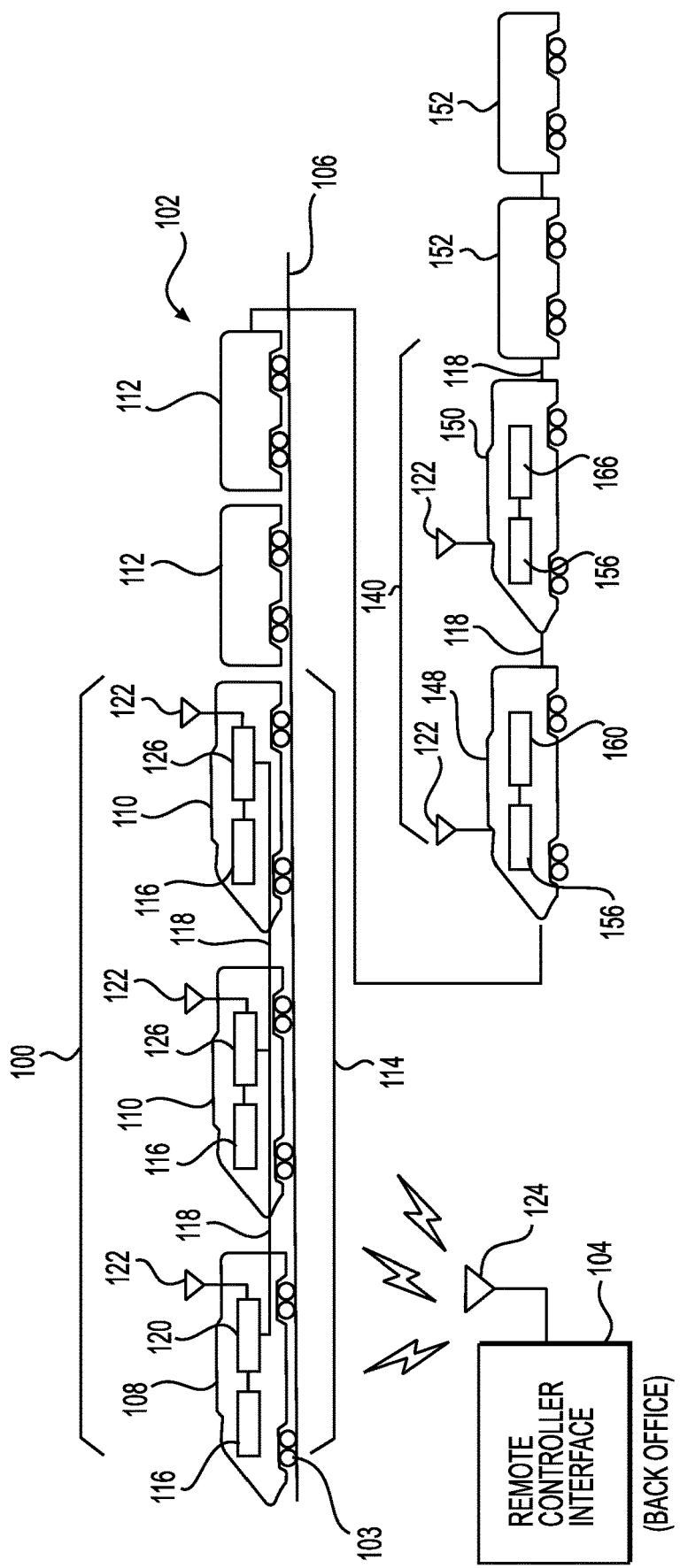
FIG. 1 is a schematic diagram of one embodiment of a control system for a train.

FIG. 1 is a schematic diagram of one embodiment of a control system 100 for operating a train 102 traveling along a track 106. The train may include multiple rail cars (including powered and/or non-powered rail cars or units) linked together as one or more consists or a single locomotive. The control system 100 may provide for cost savings, improved safety, increased reliability, operational flexibility, and convenience in the control of the train 102 through communication of network data between an off-board remote controller interface 104 and the train 102. The control system 100 may also provide a means for remote operators or third party operators to communicate with the various locomotives or other powered units of the train 102 from remote interfaces that may include any computing device connected to the Internet or other wide area or local communications network. The control system 100 may be used to convey a variety of network data and command and control signals in the form of messages communicated to the train 102, such as packetized data or information that is communicated in data packets, from the off-board remote controller interface 104. The off-board remote controller interface 104 may also be configured to receive remote alerts and other data from a controller on-board the train, and forward those alerts and data to desired parties via pagers, mobile telephone, email, and online screen alerts. The data communicated between the train 102 and the off-board remote controller interface 104 may include signals indicative of various operational parameters associated with components and subsystems of the train, signals indicative of fault conditions, signals indicative of maintenance activities or procedures, and command and control signals operative to change the state of various circuit breakers, throttles, brake controls, actuators, switches, handles, relays, and other electronically-controllable devices on-board any locomotive or other powered unit of the train 102. The remote controller interface 104 also enables the distribution of the various computer systems such as control systems and subsystems involved in operation of the train or monitoring of train operational characteristics at one or more remote locations off-board the train and accessible by authorized personnel over the Internet, wireless telecommunication networks, and by other means. In various exemplary embodiments, a centralized or cloud-based computer processing system including remote controller interface 104 may be located in one or more of a back-office server or a plurality of servers remote from the train. One or more distributed, edge-based computer processing systems may be located on-board one or more locomotives of the train, and each of the distributed computer processing systems may be communicatively connected to the centralized computer processing system.

Control system 100 may be configured to use artificial intelligence for maintaining synchronization between centralized (cloud-based) and distributed (edge-based) train control models. Synchronization between the centralized and distributed train control models may be important for ensuring that modeling of designated areas of track in real-time where one or more of the locomotives of the train may be off-lined while still maintaining required tractive effort and dynamic braking requirements is accurate and up-to-date based on all of the latest data being acquired by the control system 100. Control system 100 may include a centralized or cloud-based computer processing system located in one or more of a back-office server or a plurality of servers remote from train 102, one or more distributed, edge-based computer processing systems located on-board one or more locomotives of the train, wherein each of the distributed computer processing systems is communicatively connected to the centralized computer processing system, and a data acquisition hub 312 (see FIG. 3) communicatively connected to one or more of databases and a plurality of sensors associated with the one or more locomotives or other components of the train and configured to acquire real-time and historical configuration, structural, and operational data in association with inputs derived from real time and historical contextual data relating to a plurality of trains operating under a variety of different conditions. The acquired real-time and historical data may be used as training data by one or more centralized or distributed virtual system modeling engines.

Control system 100 may include a centralized virtual system modeling engine included in the centralized computer processing system and configured to create one or more centralized models of one or more actual train control systems in operation on-board the one of more locomotives of the train based at least in part on data received from the data acquisition hub. A first one of the centralized models may be utilized in a process of generating a first set of output control commands for a first train control scenario implemented by an energy management system associated with one or more of the locomotives. The first train control scenario may include identification of specific locomotives of the train that may be off-lined by the output control commands for predetermined periods of time over designated areas of track that the identified locomotive(s) are about to travel over. One or more distributed virtual system modeling engines may be included in one or more of the distributed computer processing systems. Each of the one or more distributed virtual system modeling engines may be configured to create one or more edge-based models of one or more actual train control systems in operation on-board the one or more locomotives of the train based at least in part on data received from the data acquisition hub. A first one of the edge-based models may be utilized in a process of generating a second set of output control commands for a second train control scenario implemented by the energy management system associated with the one or more of the locomotives. The second train control scenario may include identification of specific locomotives of the train that may be off-lined by the output control commands for predetermined periods of time over designated areas of track that the identified locomotive(s) are about to travel over.

A machine learning engine may be included in at least one of the centralized and distributed computer processing systems, the machine learning engine being configured to receive the training data from the data acquisition hub, receive the first centralized model from the centralized virtual system modeling engine, receive the first edge-based model from one of the distributed virtual system modeling engines, and compare the first set of output control commands generated by the first centralized model for the first train control scenario and the second set of output control commands generated by the first edge-based model for the second train control scenario. The machine learning engine may train a learning system using the training data to enable the machine learning engine to safely mitigate any divergence discovered between the first and second sets of output control commands using a learning function including at least one learning parameter. Training the learning system may include providing the training data as an input to the learning function, the learning function being configured to use the at least one learning parameter to generate an output based on the input, causing the learning function to generate the output based on the input, comparing the output to one or more of the first and second sets of output control commands to determine a difference between the output and the one or more of the first and second sets of output control commands, and modifying the at least one learning parameter and the output of the learning function to decrease the difference responsive to the difference being greater than a threshold difference and based at least in part on actual real time and historical information on in-train forces and train operational characteristics acquired from a plurality of trains operating under a variety of different conditions.

In various alternative exemplary embodiments according to this disclosure, a first centralized model from a centralized virtual system modeling engine may be a model that simulates portions of track over which the train is about to travel during a period of time and under a totality of circumstances that will enable the off-lining of one or more locomotives while still maintaining total tractive effort or dynamic braking force required during that period of time, thus providing savings in fuel consumption. Similarly, the first edge-based model from one of the distributed virtual system modeling engines may simulate portions of track over which one or more locomotives or consists of the train are about to travel during the same period of time simulated by the centralized virtual system modeling engine, and compare the first set of output control commands generated by the first centralized model for the first train control scenario and the second set of output control commands generated by the first edge-based model for the second train control scenario. An energy management system associated with the one or more locomotives of the train may be configured to adjust one or more of throttle requests, dynamic braking requests, and pneumatic braking requests for the one or more locomotives of the train, including actually off-lining the one or more locomotives, based at least in part on the modified output of the learning function used by the learning system which has been trained by the machine learning engine.

Some control strategies undertaken by control system 100 may include asset protection provisions, whereby asset operations are automatically derated or otherwise reduced in order to protect train assets, such as a locomotive, from entering an overrun condition and sustaining damage. For example, when the control system detects via sensors that the coolant temperature, oil temperature, crankcase pressure, or another operating parameter associated with a locomotive has exceeded a threshold, the control system may be configured to automatically reduce engine power (e.g., via a throttle control) to allow the locomotive to continue the current mission with a reduced probability of failure. In addition to derating or otherwise reducing certain asset operations based on threshold levels of operational parameters, asset protection may also include reducing or stopping certain operations based on the number, frequency, or timing of maintenance operations or faults detected by various sensors. In some cases, the control system may be configured to fully derate the propulsion systems of the locomotive and/or bring the train 102 to a complete stop to prevent damage to the propulsion systems in response to signals generated by sensors. In this way, the control system may automatically exercise asset protection provisions of its control strategy to reduce incidents of debilitating failure and the costs of associated repairs.

At times, however, external factors may dictate that the train 102 should continue to operate without an automatic reduction in engine power, without off-lining of one or more locomotives or consists, or without bringing the train to a complete stop. The costs associated with failing to complete a mission on time can outweigh the costs of greater fuel expenditures, or even the costs associated with repairing one or more components, equipment, subsystems, or systems of a locomotive. In one example, a locomotive of the train may be located near or within an area characterized by a track grade or other track conditions that require the train 102 to maintain a certain speed and momentum in order to avoid excessive wheel slippage on the locomotive, or even stoppage of the train on the grade. Factors such as the track grade, environmental factors, and power generating capabilities of one or more locomotives approaching or entering the pre-determined designated area may result in an unacceptable delay if the train were to slow down or stop. In certain situations the train may not even be able to continue forward if enough momentum is lost, resulting in considerable delays and expense while additional locomotives are moved to the area to get the train started again. In some implementations of this disclosure the geo-fences may be characterized as no-stop zones, unfavorable-stop zones, or favorable-stop zones. The centralized and distributed virtual system modeling engines discussed above may simulate models of geo-fences characterized by track grade or other track conditions during which a train or one or more consists of a train with specific characteristics may be off-lined to save fuel and/or increase longevity of locomotives or other components of the train.

In situations when a train is approaching a geo-fence characterized as one of the above-mentioned zones, managers of the train 102 may wish to temporarily modify or disable asset protection provisions associated with automatic control of the locomotive to allow the train 102 to complete its mission on time. However, managers having the responsibility or authority to make operational decisions with such potentially costly implications may be off-board the train 102 or away from a remote controller interface, such as at a back office or other network access point. To avoid unnecessary delays in reaching a decision to temporarily modify or disable asset protection provisions of automatic train operation (ATO), the control system 100 may be configured to facilitate the selection of ride-through control levels via a user interface at an on-board controller or at the off-board remote controller interface 104. The control system 100 may also be configured to generate a ride-through control command signal including information that may be used to direct the locomotive to a geo-fence with a more favorable stop zone.

Locomotive control system 100 may include a centralized or cloud-based computer processing system located in one or more of a back-office server or a plurality of servers remote from a locomotive of a train, an edge-based computer processing system located on-board the locomotive of the train, wherein the edge-based computer processing system is communicatively connected to the centralized computer processing system, and a data acquisition hub communicatively connected to one or more of databases and a plurality of sensors associated with the locomotive or other components of the train and configured to acquire real-time and historical configuration, structural, and operational data in association with inputs derived from real time and historical contextual data relating to a plurality of trains operating under a variety of different conditions and in different geographical areas, and data relating to sections of track over which the train will be traveling for use as training data. The locomotive control system may also include a centralized virtual system modeling engine included in the centralized computer processing system and configured to create a centralized model of an actual train control system in operation on-board the locomotive of the train based at least in part on data received from the data acquisition hub, wherein the centralized model is utilized in a process of generating a first set of output control commands for a first train control scenario implemented by an energy management system associated with the locomotive, and an edge-based virtual system modeling engine included in the edge-based computer processing system, the edge-based virtual system modeling engine being configured to create an edge-based model of an actual train control system in operation on-board the locomotive of the train based at least in part on data received from the data acquisition hub, wherein the edge-based model is utilized in a process of generating a second set of output control commands for a second train control scenario implemented by the energy management system associated with the locomotive.

A machine learning engine may be included in at least one of the centralized and edge-based computer processing systems. The machine learning engine may be configured to receive the training data from the data acquisition hub, receive the centralized model from the centralized virtual system modeling engine, receive the edge-based model from the edge-based virtual system modeling engine, and train a learning system using the training data to enable the machine learning engine to predict when the locomotive will enter designated areas of track where one or more locomotives of the train may be off-lined to save fuel. A train control system embodied in one or more of the centralized and edge-based computer processing systems according to one or more exemplary embodiments of this disclosure may be configured to use the machine learning engine for controlling one or more locomotives in a train by modeling and classifying sections of track along which the train is traveling according to the tractive power needs for the train traversing each section of track. The modeling and classification of the sections of track may be a function of an effective weight profile of the train in each section and an effective friction profile of each section of track. The train control system may include an effective weight module programmed to acquire a first set of real-time and historical data relating to grade vs. location for the section of track and a first set of corresponding structural information on each of the one or more locomotives and non-powered rail cars of the train traveling over the section of track, and calculate the effective weight profile of the train in the section of track using the first set of real-time and historical data and the first set of corresponding structural information. The first set of real-time and historical data relating to grade vs. location may include slopes and elevations along each particular section of track, and the first set of corresponding structural information may include one or more of the weight, the length, the effective frontal area, the number of axles of each of the locomotives and rail cars, and the weight distribution throughout the one of more locomotives and non-powered rail cars of the train traveling over the particular section of track, including the amounts of fuel being carried by the locomotives and whether the non-powered rail cars are carrying full or partial loads, or are empty. The train control system may further include an effective friction module programmed to acquire a second set of real-time and historical data relating to speed of the train vs. location for the section of track and a second set of corresponding structural information on each of the one or more locomotives and non-powered rail cars of the train traveling over the section of track, and calculate the effective friction profile of the train in the section of track from the acquired data. The speed of a train with a particular weight profile traveling over a particular section of track is indicative of the effective friction profile since a greater weight or particular weight profile may allow the train with such a weight or weight profile to maintain that speed without slippage. The train control system may still further include a power availability module programmed to acquire a third set of real-time and historical data relating to the tractive effort force vs. speed and dynamic braking force for each of the one or more locomotives traveling over the section of track, and calculate the effective power availability profile of the train in the section of track from the acquired data.

The train control system may include a virtual system modeling engine programmed to combine the results of the effective weight profile, the effective friction profile, and the effective power availability profile, and use the combined data to train one or more virtual system models to recognize designated areas of the track where the total tractive effort force or dynamic braking force applied by all of the locomotives in the train is less than the tractive effort force or dynamic braking force, respectively, provided by a subset of the available locomotives in the train for a time duration greater than the time needed to power down and power back up one or more unneeded locomotives or consists of locomotives in the train. The train control system may still further include memory for storing the one or more virtual system models simulated by the virtual system modeling engine, wherein each of the one or more virtual system models includes a mapping between different combinations of the real-time and historical data and corresponding designated areas of the track, and an energy management system associated with one or more locomotives of the train and configured to isolate or off-line the one or more unneeded locomotives or consists of locomotives for the time duration based at least in part on one of the virtual system models.

Figure 4:
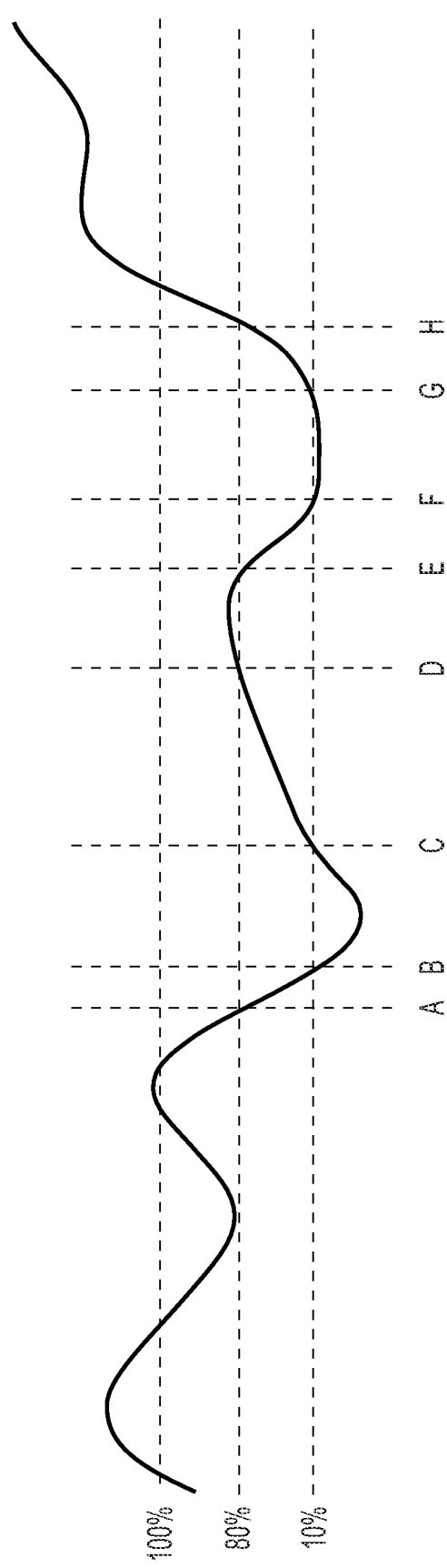
FIG. 4 is a schematic illustration of a modeled train track profile for use in off-lining one or more locomotives of a train.

As shown in FIG. 4, a train control system according to an embodiment of this disclosure may include a virtual system modeling engine configured to identify sections along a designated area of track as sections of the track where one or more locomotives or groups or consists of locomotives may be off-lined for fuel savings purposes. For example, in sections of the designated area of track between A and D and between E and H, where power requirements for the particular area of track and the particular structural and operational characteristics of the train are modeled as being below 80% of the maximum power capabilities of the train, the train control system may determine that one locomotive or one group or consist of locomotives may be off-lined while still leaving enough locomotives operating to meet all tractive effort and/or dynamic braking requirements. In sections of the designated area of track between B and C, and between F and G, where power requirements for the particular area of track and the particular structural and operational characteristics of the train are modeled as being below 10% of the maximum power capabilities of the train, the train control system may determine that two locomotives or two groups or consists of locomotives may be off-lined while still leaving enough locomotives operating to meet all tractive effort and/or dynamic braking requirements. Additionally, in the section of track between D and E, where power requirements for the particular area of track and the particular structural and operational characteristics of the train are modeled as rising only slightly above 80% of power capabilities for a relatively short distance, the train control system may determine that the amount of speed lost by off-lining the one locomotive or the one group or consist of locomotives during this section of track is outweighed by the resulting fuel savings if the one locomotive or one group or consist of locomotives is left off-line from the previous area of track between A and D and into the following area of track between E and H.

In some exemplary embodiments, training the learning system using the machine learning engine may include providing the training data as an input to a learning function including at least one learning parameter, the learning function being configured to use the at least one learning parameter to generate an output based on the input, causing the learning function to generate the output based on the input, comparing the output of the learning function to real time data to determine a difference between the prediction and actual real time data indicative of a breakdown in communication between the centralized computer processing system and the edge-based computer processing system, or an error in the modeling of designated areas of track, and modifying the at least one learning parameter and the output of the learning function to decrease the difference responsive to the difference being greater than a threshold difference. The locomotive control system may also transfer contextual data relating to the locomotive predicted to enter a designated area of track where the locomotive can be off-lined before the locomotive actually enters the designated area from the edge-based computer processing system to the centralized virtual system modeling engine in the centralized computer processing system for use in creating the centralized model. This "front-loading" of some contextualized data from an edge-based computer processing system on-board the locomotive to the centralized computer processing system ahead of the time when the machine learning engine predicts that the locomotive will enter a designated area of track may enable a centralized computer processing system with substantially more computing power than an edge-based computer processing system to continue modeling and producing train control outputs for optimized train control scenarios.

The off-board remote controller interface 104 may be connected with an antenna module 124 configured as a wireless transmitter or transceiver to wirelessly transmit data messages and control commands to the train 102. The messages and commands may originate elsewhere, such as in a rail-yard back office system, one or more remotely located servers (such as in the "cloud"), a third party server, a computer disposed in a rail-yard tower, and the like, and be communicated to the off-board remote controller interface 104 by wired and/or wireless connections. Alternatively, the off-board remote controller interface 104 may be a satellite that transmits the messages and commands down to the train 102 or a cellular tower disposed remote from the train 102 and the track 106. Other devices may be used as the off-board remote controller interface 104 to wirelessly transmit the messages. For example, other wayside equipment, base stations, or back office servers may be used as the off-board remote controller interface 104. By way of example only, the off-board remote controller interface 104 may use one or more of the Transmission Control Protocol (TCP), Internet Protocol (IP), TCP/IP, User Datagram Protocol (UDP), or Internet Control Message Protocol (ICMP) to communicate network data over the Internet with the train 102.

As described below, the network data can include information used to automatically and/or remotely control operations of the train 102 or subsystems of the train, and/or reference information stored and used by the train 102 during operation of the train 102. The network data communicated to the off-board remote controller interface 104 from the train 102 may also provide alerts and other operational information that allows for remote monitoring, diagnostics, asset management, and tracking of the state of health of all of the primary power systems and auxiliary subsystems such as HVAC, air brakes, lights, event recorders, and the like. The increased use of distributed computer system processing enabled by advances in network communications, including but not limited to 5G wireless telecommunication networks, allows for the remote location of distributed computer system processors that may perform intensive calculations and/or access large amounts of real-time and historical data related to the train configuration, structural, and operational parameters, and track grade, elevation, conditions, and other parameters. This distributed computer system processing may also introduce potential breakdowns in communication or transient latency issues between the distributed nodes of the communication network, leading to potential synchronization and calibration problems between various computer control systems and subsystems, and between centralized models created by a centralized virtual system modeling engine and edge-based models created by an edge-based virtual system modeling engine. The control system 100 and/or offboard remote control interface 104, according to various embodiments of this disclosure, may employ artificial intelligence algorithms and/or machine learning engines or processing modules to train learning algorithms and/or create virtual system models and perform comparisons between real-time data, historical data, and/or predicted data, to find indicators or patterns in which the distributed computer systems may face synchronization problems or other indications of inaccuracies in the modeling of designated areas of track. The early identification of any potential synchronization, calibration, or modeling problems between the various distributed computer systems or subsystems using machine learning and virtual system models enables early implementation of proactive measures to mitigate the problems.

The train 102 may include a lead consist 114 of powered locomotives, including the interconnected powered units 108 and 110, one or more remote or trailing consists 140 of powered locomotives, including powered units 148, 150, and additional non-powered units 112, 152. "Powered units" refers to rail cars that are capable of self-propulsion, such as locomotives. "Non-powered units" refers to rail cars that are incapable of self-propulsion, but which may otherwise receive electric power for other services. For example, freight cars, passenger cars, and other types of rail cars that do not propel themselves may be "non-powered units", even though the cars may receive electric power for cooling, heating, communications, lighting, and other auxiliary functions.

In the illustrated embodiment of FIG. 1, the powered units 108, 110 represent locomotives joined with each other in the lead consist 114. The lead consist 114 represents a group of two or more locomotives in the train 102 that are mechanically coupled or linked together to travel along a route. The lead consist 114 may be a subset of the train 102 such that the lead consist 114 is included in the train 102 along with additional trailing consists of locomotives, such as trailing consist 140, and additional non-powered units 152, such as freight cars or passenger cars. While the train 102 in FIG. 1 is shown with a lead consist 114, and a trailing consist 140, alternatively the train 102 may include other numbers of locomotive consists joined together or interconnected by one or more intermediate powered or non-powered units that do not form part of the lead and trailing locomotive consists.

The powered units 108, 110 of the lead consist 114 include a lead powered unit 108, such as a lead locomotive, and one or more trailing powered units 110, such as trailing locomotives. As used herein, the terms "lead" and "trailing" are designations of different powered units, and do not necessarily reflect positioning of the powered units 108, 110 in the train 102 or the lead consist 114. For example, a lead powered unit may be disposed between two trailing powered units. Alternatively, the term "lead" may refer to the first powered unit in the train 102, the first powered unit in the lead consist 114, and the first powered unit in the trailing consist 140. The term "trailing" powered units may refer to powered units positioned after a lead powered unit. In another embodiment, the term "lead" refers to a powered unit that is designated for primary control of the lead consist 114 and/or the trailing consist 140, and "trailing" refers to powered units that are under at least partial control of a lead powered unit.

The powered units 108, 110 include a connection at each end of the powered unit 108, 110 to couple propulsion subsystems 116 of the powered units 108, 110 such that the powered units 108, 110 in the lead consist 114 function together as a single tractive unit. The propulsion subsystems 116 may include electric and/or mechanical devices and components, such as diesel engines, electric generators, batteries, electric motors, and traction motors, used to provide tractive effort that propels the powered units 108, 110 and braking effort that slows the powered units 108, 110.

Similar to the lead consist 114, the embodiment shown in FIG. 1 also includes the trailing consist 140, including a lead powered unit 148 and a trailing powered unit 150. The trailing consist 140 may be located at a rear end of the train 102, or at some intermediate point along the train 102. Non-powered units 112 may separate the lead consist 114 from the trailing consist 140, and additional non-powered units 152 may be pulled behind the trailing consist 140.

The propulsion subsystems 116 of the powered units 108, 110 in the lead consist 114 may be connected and communicatively coupled with each other by a network connection 118. In one embodiment, the network connection 118 includes a net port and jumper cable that extends along the train 102 and between the powered units 108, 110. The network connection 118 may be a cable that includes twenty seven pins on each end that is referred to as a multiple unit cable, or MU cable. Alternatively, a different wire, cable, or bus, or other communication medium, may be used as the network connection 118. For example, the network connection 118 may represent an Electrically Controlled Pneumatic Brake line (ECPB), a fiber optic cable, or wireless connection—such as over a 5G telecommunication network. Similarly, the propulsion subsystems 156 of the powered units 148, 150 in the trailing consist 140 may be connected and communicatively coupled to each other by the network connection 118, such as a MU cable extending between the powered units 148, 150, or wireless connections.

The network connection 118 may include several channels over which network data is communicated. Each channel may represent a different pathway for the network data to be communicated. For example, different channels may be associated with different wires or busses of a multi-wire or multi-bus cable. Alternatively, the different channels may represent different frequencies or ranges of frequencies over which the network data is transmitted.

The powered units 108, 110 may include communication units 120, 126 configured to communicate information used in the control operations of various components and subsystems, such as the propulsion subsystems 116 of the powered units 108, 110. The communication unit 120 disposed in the lead powered unit 108 may be referred to as a lead communication unit. The lead communication unit 120 may be the unit that initiates the transmission of data packets forming a message to the off-board, remote controller interface 104. For example, the lead communication unit 120 may transmit a message via a WiFi or cellular modem to the off-board remote controller interface 104. The message may contain information on an operational state of the lead powered unit 108, such as a throttle setting, a brake setting, readiness for dynamic braking, the tripping of a circuit breaker on-board the lead powered unit, or other operational characteristics. Additional operational information associated with a locomotive such as an amount of wheel slippage, wheel temperatures, wheel bearing temperatures, brake temperatures, and dragging equipment detection may also be communicated from sensors on-board a locomotive or other train asset, or from various sensors located in wayside equipment or sleeper ties positioned at intervals along the train track. The communication units 126 may be disposed in different trailing powered units 110 and may be referred to as trailing communication units. Alternatively, one or more of the communication units 120, 126 may be disposed outside of the corresponding powered units 108, 110, such as in a nearby or adjacent non-powered unit 112. Another lead communication unit 160 may be disposed in the lead powered unit 148 of the trailing consist 140. The lead communication unit 160 of the trailing consist 140 may be a unit that receives data packets forming a message transmitted by the off-board, remote controller interface 104. For example, the lead communication unit 160 of the trailing consist 140 may receive a message from the off-board remote controller interface 104 providing operational commands that are based upon the information transmitted to the off-board remote controller interface 104 via the lead communication unit 120 of the lead powered unit 108 of the lead consist 114. A trailing communication unit 166 may be disposed in a trailing powered unit 150 of the trailing consist 140, and interconnected with the lead communication unit 160 via the network connection 118.

The communication units 120, 126 in the lead consist 114, and the communication units 160, 166 in the trailing consist 140 may be connected with the network connection 118 such that all of the communication units for each consist are communicatively coupled with each other by the network connection 118 and linked together in a computer network. Alternatively, the communication units may be linked by another wire, cable, or bus, or be linked by one or more wireless connections.

The networked communication units 120, 126, 160, 166 may include antenna modules 122. The antenna modules 122 may represent separate individual antenna modules or sets of antenna modules disposed at different locations along the train 102. For example, an antenna module 122 may represent a single wireless receiving device, such as a single 220 MHz TDMA antenna module, a single cellular modem, a single wireless local area network (WLAN) antenna module (such as a "Wi-Fi" antenna module capable of communicating using one or more of the IEEE 802.11 standards or another standard), a single WiMax (Worldwide Interoperability for Microwave Access) antenna module, a single satellite antenna module (or a device capable of wirelessly receiving a data message from an orbiting satellite), a single 3G antenna module, a single 4G antenna module, a single 5G antenna module, and the like. As another example, an antenna module 122 may represent a set or array of antenna modules, such as multiple antenna modules having one or more TDMA antenna modules, cellular modems, Wi-Fi antenna modules, WiMax antenna modules, satellite antenna modules, 3G antenna modules, 4G antenna modules, and/or 5G antenna modules.

As shown in FIG. 1, the antenna modules 122 may be disposed at spaced apart locations along the length of the train 102. For example, the single or sets of antenna modules represented by each antenna module 122 may be separated from each other along the length of the train 102 such that each single antenna module or antenna module set is disposed on a different powered or non-powered unit 108, 110, 112, 148, 150, 152 of the train 102. The antenna modules 122 may be configured to send data to and receive data from the off-board remote controller interface 104. For example, the off-board remote controller interface 104 may include an antenna module 124 that wirelessly communicates the network data from a remote location that is off of the track 106 to the train 102 via one or more of the antenna modules 122. Alternatively, the antenna modules 122 may be connectors or other components that engage a pathway over which network data is communicated, such as through an Ethernet connection.

The diverse antenna modules 122 enable the train 102 to receive the network data transmitted by the off-board remote controller interface 104 at multiple locations along the train 102. Increasing the number of locations where the network data can be received by the train 102 may increase the probability that all, or a substantial portion, of a message conveyed by the network data is received by the train 102. For example, if some antenna modules 122 are temporarily blocked or otherwise unable to receive the network data as the train 102 is moving relative to the off-board remote controller interface 104, other antenna modules 122 that are not blocked and are able to receive the network data may receive the network data. An antenna module 122 receiving data and command control signals from the off-board device 104 may in turn re-transmit that received data and signals to the appropriate lead communication unit 120 of the lead locomotive consist 114, or the lead communication unit 160 of the trailing locomotive consist 140. Any data packet of information received from the off-board remote controller interface 104 may include header information or other means of identifying which locomotive in which locomotive consist the information is intended for. Although the lead communication unit 120 on the lead consist may be the unit that initiates the transmission of data packets forming a message to the off-board, remote controller interface 104, all of the lead and trailing communication units may be configured to receive and transmit data packets forming messages. Accordingly, in various alternative implementations according to this disclosure, a command control signal providing operational commands for the lead and trailing locomotives may originate at the remote controller interface 104 rather than at the lead powered unit 108 of the lead consist 114.

Each locomotive or powered unit of the train 102 may include a car body supported at opposing ends by a plurality of trucks. Each truck may be configured to engage the track 106 via two axles and wheels at the opposite ends of the axles, and to support a frame of the car body. One or more traction motors may be associated with one or all wheels of a particular truck, and any number of engines and generators may be mounted to the frame within the car body to make up the propulsion subsystems 116, 156 on each of the powered units. The propulsion subsystems 116, 156 of each of the powered units may be further interconnected throughout the train 102 along one or more high voltage power cables in a power sharing arrangement. Energy storage devices (not shown) may also be included for short term or long term storage of energy generated by the propulsion subsystems or by the traction motors when the traction motors are operated in a dynamic braking or generating mode. Energy storage devices may include batteries, ultra-capacitors, flywheels, fluid accumulators, and other energy storage devices with capabilities to store large amounts of energy rapidly for short periods of time, or more slowly for longer periods of time, depending on the needs at any particular time. The DC or AC power provided from the propulsion subsystems 116, 156 or energy storage devices along the power cable may drive AC or DC traction motors to propel the wheels. Each of the traction motors may also be operated in a dynamic braking mode as a generator of electric power that may be provided back to the power cables and/or energy storage devices. Control over engine operation (e.g., starting, stopping, fueling, exhaust aftertreatment, etc.) and traction motor operation, as well as other locomotive controls, may be provided by way of an on-board controller 200 and various operational control devices housed within a cab supported by the frame of the train 102. In some implementations of this disclosure, initiation of these controls may be implemented in the cab of the lead powered unit 108 in the lead consist 114 of the train 102. In other alternative implementations, initiation of operational controls may be implemented off-board at the remote controller interface 104, or at a powered unit of a trailing consist. As discussed above, the various computer control systems involved in the operation of the train 102 may be distributed across a number of local and/or remote physical locations and communicatively coupled over one or more wireless or wired communication networks.

Figure 2:
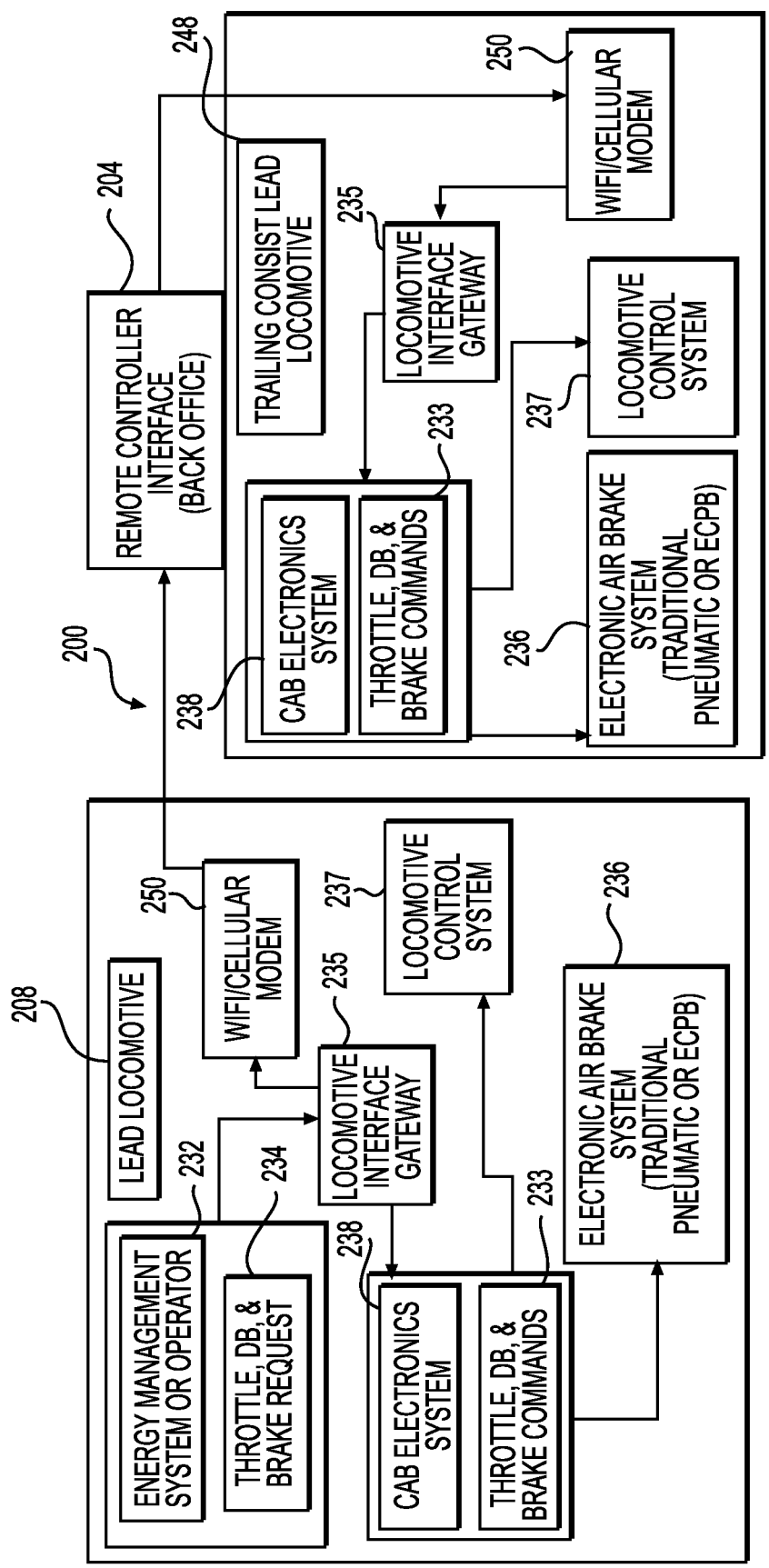
FIG. 2 is a schematic diagram of one implementation of a portion of the control system of FIG. 1.

As shown in FIG. 2, an exemplary implementation of the control system 100 may include the on-board controller 200. The on-board controller 200 may include an energy management system 232 configured to determine, e.g., one or more of throttle requests, dynamic braking requests, and pneumatic braking requests 234 for one or more of the powered and non-powered units of the train. The energy management system 232 may be configured to make these various requests based on a variety of measured operational parameters, track grade, track conditions, freight loads, and predetermined maps, virtual system models, or other stored data with one or more goals of improving availability, safety, timeliness, overall fuel economy and emissions output for individual powered units, consists, or the entire train. The cab of the lead powered unit 108, 148 in each of the consists may also house a plurality of operational control devices and control system interfaces. The operational control devices may be used by an operator to manually control the locomotive, or may be controlled electronically via messages received from off-board the train. Operational control devices may include, among other things, an engine run/isolation switch, a generator field switch, an automatic brake handle, an independent brake handle, a lockout device, and any number of circuit breakers. Manual input devices may include switches, levers, pedals, wheels, knobs, push-pull devices, touch screen displays, etc.

Operation of the engines, generators, inverters, converters, and other auxiliary devices may be at least partially controlled by switches or other operational control devices that may be manually movable between a run or activated state and an isolation or deactivated state by an operator of the train 102. The operational control devices may be additionally or alternatively activated and deactivated by solenoid actuators or other electrical, electromechanical, or electro-hydraulic devices. The off-board remote controller interface 104, 204 may also require compliance with security protocols to ensure that only designated personnel may remotely activate or deactivate components on-board the train from the off-board remote controller interface after certain prerequisite conditions have been met. The off-board remote controller interface may include various security algorithms or other means of comparing an operator authorization input with a predefined security authorization parameter or level. The security algorithms may also establish restrictions or limitations on controls that may be performed based on the location of a locomotive, authorization of an operator, and other parameters.

Circuit breakers may be associated with particular components or subsystems of a locomotive on the train 102, and configured to trip when operating parameters associated with the components or subsystems deviate from expected or predetermined ranges. For example, circuit breakers may be associated with power directed to individual traction motors, HVAC components, and lighting or other electrical components, circuits, or subsystems. When a power draw greater than an expected draw occurs, the associated circuit breaker may trip, or switch from a first state to a second state, to interrupt the corresponding circuit. In some implementations of this disclosure, a circuit breaker may be associated with an on-board control system or communication unit that controls wireless communication with the off-board remote controller interface. After a particular circuit breaker trips, the associated component or subsystem may be disconnected from the main electrical circuit of the locomotive 102 and remain nonfunctional until the corresponding breaker is reset. The circuit breakers may be manually tripped or reset. Alternatively or in addition, the circuit breakers may include actuators or other control devices that can be selectively energized to autonomously or remotely switch the state of the associated circuit breakers in response to a corresponding command received from the off-board remote controller interface 104, 204. In some embodiments, a maintenance signal may be transmitted to the off-board remote controller interface 104, 204 upon switching of a circuit breaker from a first state to a second state, thereby indicating that action such as a reset of the circuit breaker may be needed.

In some situations, train 102 may travel through several different geographic regions or designated areas of track where one or more locomotives may be off-lined, and encounter different operating conditions in each region. For example, different regions may be associated with varying track conditions, steeper or flatter grades, speed restrictions, noise restrictions, and/or other such conditions. Some operating conditions in a given geographic region may also change over time as, for example, track rails wear and speed and/or noise restrictions are implemented or changed. Other circumstantial and contextual conditions, such as distances between sidings, distances from rail yards, limitations on access to maintenance resources, and other such considerations may vary throughout the course of mission. Operators may therefore wish to implement certain control parameters in certain geographic regions to address particular operating conditions.

To help operators implement desired control strategies based on the geographic location of the train 102, the on-board controller 200 may be configured to include a graphical user interface (GUI) that allows operators and/or other users to establish and define the parameters of geo-fences along a travel route. A geo-fence is a virtual barrier that may be set up in a software program and used in conjunction with global positioning systems (GPS) or radio frequency identification (RFID) to define geographical boundaries. As an example, a geo-fence may be defined along a length of track that has a grade greater than a certain threshold. A first geo-fence may define a no-stop zone, where the track grade is so steep that a train will not be able to traverse the length of track encompassed by the first geo-fence if allowed to stop. A second geo-fence may define an unfavorable-stop zone, where the grade is steep enough that a train stopping in the unfavorable-stop zone may be able to traverse the second geo-fence after a stop, but will miss a trip objective such as arriving at a destination by a certain time. A third geo-fence may define a favorable-stop zone, where the grade of the track is small enough that the train will be able to come to a complete stop within the favorable-stop zone for reasons such as repair or adjustment of various components or subsystems, and then resume travel and traverse the third geo-fence while meeting all trip objectives.

The remote controller interface 104 may include a GUI configured to display information and receive user inputs associated with the train. The GUI may be a graphic display tool including menus (e.g., drop-down menus), modules, buttons, soft keys, toolbars, text boxes, field boxes, windows, and other means to facilitate the conveyance and transfer of information between a user and remote controller interface 104, 204. Access to the GUI may require user authentication, such as, for example, a username, a password, a pin number, an electromagnetic passkey, etc., to display certain information and/or functionalities of the GUI.

The energy management system 232 of the controller 200 on-board a lead locomotive 208 may be configured to automatically determine one or more of throttle requests, dynamic braking requests, and pneumatic braking requests 234 for one or more of the powered and non-powered units of the train. The energy management system 232 may be configured to make these various requests based on a variety of measured operational parameters, track conditions, freight loads, and predetermined maps or other stored data with a goal of improving one or more of availability, safety, timeliness, overall fuel economy and emissions output for individual locomotives, consists, or the entire train. Some of the measured operational parameters such as track grade or other track conditions may be associated with one or more predetermined geo-fences. The cab of the lead locomotive 208 in each of the consists 114, 140 along the train 102 may also house a plurality of input devices, operational control devices, and control system interfaces. The input devices may be used by an operator to manually control the locomotive, or the operational control devices may be controlled electronically via messages received from off-board the train. The input devices and operational control devices may include, among other things, an engine run/isolation switch, a generator field switch, an automatic brake handle (for the entire train and locomotives), an independent brake handle (for the locomotive only), a lockout device, and any number of circuit breakers. Manual input devices may include switches, levers, pedals, wheels, knobs, push-pull devices, and touch screen displays. The controller 200 may also include a microprocessor-based locomotive control system 237 having at least one programmable logic controller (PLC), a cab electronics system 238, and an electronic air (pneumatic) brake system 236, all mounted within a cab of the locomotive. The cab electronics system 238 may comprise at least one integrated display computer configured to receive and display data from the outputs of one or more of machine gauges, indicators, sensors, and controls. The cab electronics system 238 may be configured to process and integrate the received data, receive command signals from the off-board remote controller interface 204, and communicate commands such as throttle, dynamic braking, and pneumatic braking commands 233 to the microprocessor-based locomotive control system 237.

The microprocessor-based locomotive control system 237 may be communicatively coupled with the traction motors, engines, generators, braking subsystems, input devices, actuators, circuit breakers, and other devices and hardware used to control operation of various components and subsystems on the locomotive. In various alternative implementations of this disclosure, some operating commands, such as throttle and dynamic braking commands, may be communicated from the cab electronics system 238 to the locomotive control system 237, and other operating commands, such as braking commands, may be communicated from the cab electronics system 238 to a separate electronic air brake system 236. One of ordinary skill in the art will recognize that the various functions performed by the locomotive control system 237 and electronic air brake system 236 may be performed by one or more processing modules or controllers through the use of hardware, software, firmware, or various combinations thereof. Examples of the types of controls that may be performed by the locomotive control system 237 may include radar-based wheel slip control for improved adhesion, automatic engine start stop (AESS) for improved fuel economy, control of the lengths of time at which traction motors are operated at temperatures above a predetermined threshold, control of generators/alternators, control of inverters/converters, the amount of exhaust gas recirculation (EGR) and other exhaust aftertreatment processes performed based on detected levels of certain pollutants, and other controls performed to improve safety, increase overall fuel economy, reduce overall emission levels, and increase longevity and availability of the locomotives. The at least one PLC of the locomotive control system 237 may also be configurable to selectively set predetermined ranges or thresholds for monitoring operating parameters of various subsystems. When a component detects that an operating parameter has deviated from the predetermined range, or has crossed a predetermined threshold, a maintenance signal may be communicated off-board to the remote controller interface 204. The at least one PLC of the locomotive control system 237 may also be configurable to receive one or more command signals indicative of at least one of a throttle command, a dynamic braking readiness command, and an air brake command 233, and output one or more corresponding command control signals configured to at least one of change a throttle position, activate or deactivate dynamic braking, and apply or release a pneumatic brake, respectively.

The cab electronics system 238 may provide integrated computer processing and display capabilities on-board the train 102, and may be communicatively coupled with a plurality of cab gauges, indicators, and sensors, as well as being configured to receive commands from the remote controller interface 204. The cab electronics system 238 may be configured to process outputs from one or more of the gauges, indicators, and sensors, and supply commands to the locomotive control system 237. In various implementations, the remote controller interface 204 may comprise a distributed system of servers, on-board and/or off-board the train, or a single laptop, hand-held device, or other computing device or server with software, encryption capabilities, and Internet access for communicating with the on-board controller 200 of the lead locomotive 208 of a lead consist and the lead locomotive 248 of a trailing consist. Control command signals generated by the cab electronics system 238 on the lead locomotive 208 of the lead consist may be communicated to the locomotive control system 237 of the lead locomotive of the lead consist, and may be communicated in parallel via a WiFi/cellular modem 250 off-board to the remote controller interface 204. The lead communication unit 120 on-board the lead locomotive of the lead consist may include the WiFi/cellular modem 250 and any other communication equipment required to modulate and transmit the command signals off-board the locomotive and receive command signals on-board the locomotive. As shown in FIG. 2, the remote controller interface 204 may relay commands received from the lead locomotive 208 via another WiFi/cellular modem 250 to another cab electronics system 238 on-board the lead locomotive 248 of the trailing consist.

The control systems and interfaces on-board and off-board the train may embody single or multiple microprocessors, field programmable gate arrays (FPGAs), digital signal processors (DSPs), programmable logic controllers (PLCs), etc., that include means for controlling operations of the train 102 in response to operator requests, built-in constraints, sensed operational parameters, and/or communicated instructions from the remote controller interface 104, 204. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

The locomotives 208, 248 may be outfitted with any number and type of sensors known in the art for generating signals indicative of associated control configurations, structural parameters, or operating parameters. In one example, a locomotive 208, 248 may include a temperature sensor configured to generate a signal indicative of a coolant temperature of an engine on-board the locomotive. Additionally or alternatively, sensors may include brake temperature sensors, exhaust sensors, fuel level sensors, pressure sensors, structural stress sensors, knock sensors, reductant level or temperature sensors, speed sensors, motion detection sensors, location sensors, or any other sensor known in the art. The signals generated by the sensors may be directed to the cab electronics system 238 for further processing and generation of appropriate commands.

Any number and type of warning devices may also be located on-board each locomotive, including an audible warning device and/or a visual warning device. Warning devices may be used to alert an operator on-board a locomotive of an impending operation, for example startup of the engine(s). Warning devices may be triggered manually from on-board the locomotive (e.g., in response to movement of a component or operational control device to the run state) and/or remotely from off-board the locomotive (e.g., in response to control command signals received from the remote controller interface 204.) When triggered from off-board the locomotive, a corresponding command signal used to initiate operation of the warning device may be communicated to the on-board controller 200 and the cab electronics system 238.

The on-board controller 200 and the off-board remote controller interface 204 may include any means for monitoring, recording, storing, indexing, processing, and/or communicating various operational aspects of the locomotive 208, 248. These means may include components such as, for example, a memory, one or more data storage devices, a central processing unit, or any other components that may be used to run an application. Furthermore, although aspects of the present disclosure may be described generally as being stored in memory, one skilled in the art will appreciate that these aspects can be stored on or read from different types of computer program products or non-transitory computer-readable media such as computer chips and secondary storage devices, including hard disks, floppy disks, optical media, CD-ROM, or other forms of RAM or ROM.

The off-board remote controller interface 204 may be configured to execute instructions stored on non-transitory computer readable medium to perform methods of remote control of the locomotive 230. That is, as will be described in more detail in the following section, on-board control (manual and/or autonomous control) of some operations of the locomotive (e.g., operations of traction motors, engine (s), circuit breakers, etc.) may be selectively overridden by the off-board remote controller interface 204.

Remote control of the various powered and non-powered units on the train 102 through communication between the on-board cab electronics system 238 and the off-board remote controller interface 204 may be facilitated via the various communication units 120, 126, 160, 166 spaced along the train 102. The communication units may include hardware and/or software that enables sending and receiving of data messages between the powered units of the train and the off-board remote controller interfaces. The data messages may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable the communication units to exchange information between the off-board remote controller interfaces and the various components and subsystems of the train 102.

As shown in the exemplary embodiment of FIG. 2, the cab electronics system 238 may be configured to receive the requests 234 after they have been processed by a locomotive interface gateway (LIG) 235, which may also enable modulation and communication of the requests through a WiFi/cellular modem 250 to the off-board remote controller interface (back office) 204. The cab electronics system 238 may be configured to communicate commands (e.g., throttle, dynamic braking, and braking commands 233) to the locomotive control system 237 and an electronic air brake system 236 on-board the lead locomotive 208 in order to autonomously control the movements and/or operations of the lead locomotive.

In parallel with communicating commands to the locomotive control system 237 of the lead locomotive 208, the cab electronics system 238 on-board the lead locomotive 208 of the lead consist may also communicate commands to the off-board remote controller interface 204. The commands may be communicated either directly or through the locomotive interface gateway 235, via the WiFi/cellular modem 250, off-board the lead locomotive 208 of the lead consist to the remote controller interface 204. The remote controller interface 204 may then communicate the commands received from the lead locomotive 208 to the trailing consist lead locomotive 248. The commands may be received at the trailing consist lead locomotive 248 via another WiFi/cellular modem 250, and communicated either directly or through another locomotive interface gateway 235 to a cab electronics system 238. The cab electronics system 238 on-board the trailing consist lead locomotive 248 may be configured to communicate the commands received from the lead locomotive 208 of the lead consist to a locomotive control system 237 and an electronic air brake system 236 on-board the trailing consist lead locomotive 248. The commands from the lead locomotive 208 of the lead consist may also be communicated via the network connection 118 from the trailing consist lead locomotive 248 to one or more trailing powered units 150 of the trailing consist 140. The result of configuring all of the lead powered units of the lead and trailing consists to communicate via the off-board remote controller interface 204 is that the lead powered unit of each trailing consist may respond quickly and in close coordination with commands responded to by the lead powered unit of the lead consist. Additionally, each of the powered units in various consists along a long train may quickly and reliably receive commands such as throttle, dynamic braking, and pneumatic braking commands 234 initiated by a lead locomotive in a lead consist regardless of location and conditions.

The integrated cab electronics systems 238 on the powered units of the lead consist 114 and on the powered units of the trailing consist 140 may also be configured to receive and generate commands for configuring or reconfiguring various switches, handles, and other operational control devices on-board each of the powered units of the train as required before the train begins on a journey, or after a failure occurs that requires reconfiguring of all or some of the powered units. Examples of switches and handles that may require configuring or reconfiguring before a journey or after a failure may include an engine run switch, a generator field switch, an automatic brake handle, and an independent brake handle. Remotely controlled actuators on-board the powered units in association with each of the switches and handles may enable remote, autonomous configuring and reconfiguring of each of the devices. For example, before the train begins a journey, or after a critical failure has occurred on one of the lead or trailing powered units, commands may be sent from the off-board remote controller interface 204 to any powered unit in order to automatically reconfigure all of the switches and handles as required on-board each powered unit without requiring an operator to be on-board the train. Following the reconfiguring of all of the various switches and handles on-board each locomotive, the remote controller interface may also send messages to the cab electronics systems on-board each locomotive appropriate for generating other operational commands such as changing throttle settings, activating or deactivating dynamic braking, and applying or releasing pneumatic brakes. This capability saves the time and expense of having to delay the train while sending an operator to each of the powered units on the train to physically switch and reconfigure all of the devices required.

Figure 3:
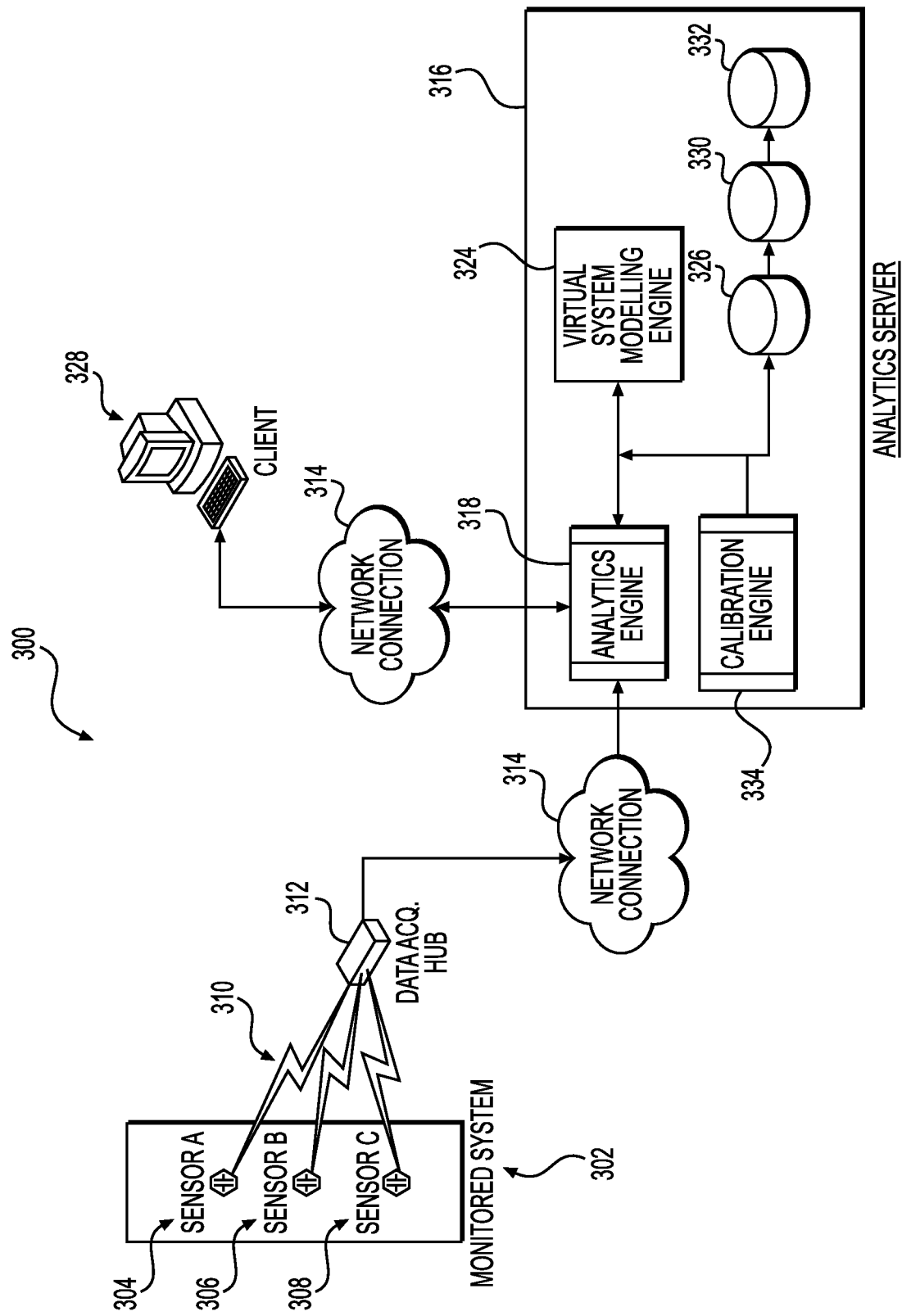
FIG. 3 is a schematic diagram of a locomotive control system utilizing real-time and historical data for creating virtual system models of a track for use in off-lining locomotives of a train.

FIG. 3 is an illustration of a system according to an exemplary embodiment of this disclosure for utilizing real-time data for predictive analysis of the performance of a monitored computer system, such as train control system 100 shown in FIG. 1. The system 300 may include a series of sensors (i.e., Sensor A 304, Sensor B 306, Sensor C 308) interfaced with the various components of a monitored system 302, a data acquisition hub 312, an analytics server 316, and a client device 328. The monitored system 302 may include one or more of the train control systems illustrated in FIG. 2, such as an energy management system, a cab electronics system, and a locomotive control system. It should be understood that the monitored system 302 can be any combination of components whose operations can be monitored with sensors and where each component interacts with or is related to at least one other component within the combination. For a monitored system 302 that is a train control system, the sensors may include brake temperature sensors, exhaust sensors, fuel level sensors, pressure sensors, knock sensors, structural stress sensors, reductant level or temperature sensors, generator power output sensors, voltage or current sensors, speed sensors, motion detection sensors, location sensors, wheel temperature or bearing temperature sensors, or any other sensor known in the art for monitoring various train control configurations, structural parameters, and operational parameters.

The sensors are configured to provide output values for system parameters that indicate the operational status and/or "health" of the monitored system 302. The sensors may include sensors for monitoring the operational status and/or health of the various physical systems associated with operation of a train, as well as the operational status of the various computer systems and subsystems associated with operation of the train. The sensors may also be configured to measure additional data that can affect system operation. For example, sensor output can include environmental information, e.g., temperature, humidity, etc., which can impact the operation and efficiency of the various train control systems.

In one exemplary embodiment, the various sensors 304, 306, 308 may be configured to output data in an analog format. For example, electrical power sensor measurements (e.g., voltage, current, etc.) are sometimes conveyed in an analog format as the measurements may be continuous in both time and amplitude. In another embodiment, the sensors may be configured to output data in a digital format. For example, the same electrical power sensor measurements may be taken in discrete time increments that are not continuous in time or amplitude. In still another embodiment, the sensors may be configured to output data in either an analog or digital format depending on the sampling requirements of the monitored system 302.

The sensors can be configured to capture output data at split-second intervals to effectuate "real time" data capture. For example, in one embodiment, the sensors can be configured to generate hundreds of thousands of data readings per second. It should be appreciated, however, that the number of data output readings taken by a sensor may be set to any value as long as the operational limits of the sensor and the data processing capabilities of the data acquisition hub 312 are not exceeded.

Each sensor may be communicatively connected to the data acquisition hub 312 via an analog or digital data connection 310. The data acquisition hub 312 may be a standalone unit or integrated within the analytics server 316 and can be embodied as a piece of hardware, software, or some combination thereof. In one embodiment, the data connection 310 is a "hard wired" physical data connection (e.g., serial, network, etc.). For example, a serial or parallel cable connection between the sensor and the hub 312. In another embodiment, the data connection 310 is a wireless data connection. For example, a 5G radio frequency (RF) cellular connection, BLUETOOTH™, infrared or equivalent connection between the sensor and the hub 312.

The data acquisition hub 312 may be configured to communicate "real-time" data from the monitored system 302 to the analytics server 316 using a network connection 314. In one embodiment, the network connection 314 is a "hardwired" physical connection. For example, the data acquisition hub 312 may be communicatively connected (via Category 5 (CAT5), fiber optic or equivalent cabling) to a data server (not shown) that is communicatively connected (via CAT5, fiber optic or equivalent cabling) through the Internet and to the analytics server 316 server, the analytics server 316 being also communicatively connected with the Internet (via CAT5, fiber optic, or equivalent cabling). In another embodiment, the network connection 314 is a wireless network connection (e.g., 5G cellular, Wi-Fi, WLAN, etc.). For example, utilizing an 802.11a/b/g or equivalent transmission format. In practice, the network connection utilized is dependent upon the particular requirements of the monitored system 302. Data acquisition hub 312 may also be configured to supply warning and alarms signals as well as control signals to monitored system 302 and/or sensors 304, 306, and 308 as described in more detail below.

As shown in FIG. 3, in one embodiment, the analytics server 316 may host an analytics engine 318, a virtual system modeling engine 324, a calibration engine 334, and several databases 326, 330, and 332. Additional engines or processing modules may also be included in analytics server 316, such as an operator behavior modeling engine, a simulation engine, and other machine learning or artificial intelligence engines or processing modules. The virtual system modeling engine 324 can be, e.g., a computer modeling system. In this context, the modeling engine can be used to precisely model and mirror the actual train control systems and subsystems. Analytics engine 318 can be configured to generate predicted data for the monitored systems and analyze differences between the predicted data and the real-time data received from data acquisition hub 312. Analytics server 316 may be interfaced with a monitored train control system 302 via sensors, e.g., sensors 304, 306, and 308. The various sensors are configured to supply real-time data from the various physical components and computer systems and subsystems of train 102. The real-time data is communicated to analytics server 316 via data acquisition hub 312 and network 314.

Data acquisition hub 312 can be configured to provide real-time data to analytics server 316 as well as alarming, sensing and control features for the monitored system 302, such as the train control system 100. In some implementations according to this disclosure, the results of periodic non-destructive evaluations (NDE) of various train components such as the knuckles interconnecting powered and non-powered rail cars of the train may be combined with other real-time and historical data from data acquisition hub 312 by a simulation engine of analytics server 316 for predicting when a potential failure of the component may occur. Computer vision algorithms may be employed, for example, in evaluating images taken of a knuckle during NDE, and analyzing life expectancy of the knuckle before a predicted failure. Other forms of NDE such as gamma imaging, infrared imaging, and ultrasonic testing may also be employed on components such as knuckles, brake rigging, brake shoes, axles, wheel sets, and any other structural components subjected to stresses during operation of the train. The simulation engine and machine learning algorithms may be configured and programmed to predict expected forces that will act on the component following the NDE, and predict the time or amount of usage until an expected failure. The results of such predictive failure analysis may enable implementation of optimal repair and replacement protocols, such as by scheduling replacement of a knuckle with a predicted failure that falls within a predetermined threshold time period at a convenient repair location such as a train yard.

The real-time data from data acquisition hub 312 can be passed to a comparison engine, which can be separate from or form part of analytics engine 318. The comparison engine can be configured to continuously compare the real-time data with predicted values generated by virtual system modeling engine 324 or another simulation engine included as part of analytics server 316. Based on the comparison, the comparison engine can be further configured to determine whether deviations between the real-time values and the predicted values exist, and if so to classify the deviation, e.g., high, marginal, low, etc. The deviation level can then be communicated to a decision engine, which can also be included as part of analytics engine 318 or as a separate processing module. The decision engine can be configured to look for significant deviations between the predicted values and real-time values as received from the comparison engine. If significant deviations are detected, the decision engine can also be configured to determine whether an alarm condition exists, activate the alarm and communicate the alarm to a Human-Machine Interface (HMI) for display in real-time via, e.g., client 328. The decision engine of analytics engine 318 can also be configured to perform root cause analysis for significant deviations in order to determine the interdependencies and identify any failure relationships that may be occurring. The decision engine can also be configured to determine health and performance levels and indicate these levels for the various processes and equipment via the HMI of client 328. All of which, when combined with the analytical and machine learning capabilities of analytics engine 318 allows the operator to minimize the risk of catastrophic equipment failure by predicting future failures and providing prompt, informative information concerning potential/predicted failures before they occur. Avoiding catastrophic failures reduces risk and cost, and maximizes facility performance and up time.

A simulation engine that may be included as part of analytics server 316 may operate on complex logical models of the various control systems and subsystems of on-board controller 200 and train control system 100. These models may be continuously and automatically synchronized with the actual status of the control systems based on the real-time and historical data provided by the data acquisition hub 312 to analytics server 316. In other words, the models are updated based on current switch status, breaker status, e.g., open-closed, equipment on/off status, etc. Thus, the models are automatically updated based on such status, which allows a simulation engine to produce predicted data based on the current train operational status. This in turn, allows accurate and meaningful comparisons of the real-time data to the predicted data. Example models that can be maintained and used by analytics server 316 may include models used to determine designated areas of track where the total tractive effort force or dynamic braking force applied by all of the locomotives in the train is less than the tractive effort force or dynamic braking force, respectively, provided by a subset of the available locomotives in the train for a time duration greater than the time needed to power down and power back up one or more unneeded locomotives or consists of locomotives in the train. Other models may be used to determine optimal operational parameters for a prime mover power source, determine component operational requirements for improved asset life expectancy, determine efficient allocation and utilization of computer control systems and computer resources, etc. In certain embodiments, data acquisition hub 312 may also be configured to supply equipment identification associated with the real-time data. This identification can be cross referenced with identifications provided in the models.

In one embodiment, if a comparison performed by a comparison engine indicates that a differential between a real-time sensor output value and an expected or predicted value exceeds a threshold value but remains below an alarm condition (i.e., alarm threshold value), a calibration request may be generated by the analytics engine 318. If the differential exceeds the alarm threshold value, an alarm or notification message may be generated by the analytics engine 318. The alarm or notification message may be sent directly to the client (i.e., user) 328 for display in real-time on a web browser, pop-up message box, e-mail, or equivalent on the client 328 display panel. In another embodiment, the alarm or notification message may be sent to a wireless mobile device to be displayed for the user by way of a wireless router or equivalent device interfaced with the analytics server 316. The alarm can be indicative of a need for a repair event or maintenance, such as synchronization of any computer control systems that are no longer communicating within allowable latency parameters. The responsiveness, calibration, and synchronization of various computer systems can also be tracked by comparing expected or predicted operational characteristics based on historical data associated with the various systems and subsystems of the train to actual characteristics measured after implementation of control commands, or by comparing actual measured parameters to predicted parameters under different operating conditions.

Virtual system modeling engine 324 may create multiple models that can be stored in the virtual system model database 326. Machine learning algorithms may be employed by virtual system modeling engine 324 to create a variety of virtual model applications based on real time and historical data gathered by data acquisition hub 314 from a large variety of sensors measuring track characteristics, including grade and speed limits, operational parameters of train 102 and/or a number of additional trains with locomotives of different types operating under a variety of different conditions and in different geographical areas. As discussed above, virtual system modeling engine 324 may be configured to model designated areas of the track where the total tractive effort force or dynamic braking force applied by all of the locomotives in the train is less than the tractive effort force or dynamic braking force, respectively, provided by a subset of the available locomotives in the train for a time duration greater than the time needed to power down and power back up one or more unneeded locomotives or consists of locomotives in the train. The virtual system models may also include components for modeling reliability and life expectancy of various train components, physical systems, and distributed computer control systems. In addition, the virtual system models created by virtual system modeling engine 324 may include dynamic control logic that permits a user to configure the models by specifying control algorithms and logic blocks in addition to combinations and interconnections of train operational components and control systems. Virtual system model database 326 can be configured to store the virtual system models, and perform what-if simulations. In other words, the database of virtual system models can be used to allow a system designer to make hypothetical changes to the train control systems and test the resulting effect, without having to actually take the train out of service or perform costly and time consuming analysis. Such hypothetical simulations performed by virtual systems modeling engine 324 can be used to learn failure patterns and signatures as well as to test proposed modifications, upgrades, additions, etc., for the train control system. The real-time data, as well as detected trends and patterns produced by analytics engine 318 can be stored in real-time data acquisition databases 330 and 332.

According to various exemplary embodiments of this disclosure, a method of using artificial intelligence for maintaining synchronization between centralized and distributed train control models may include providing a centralized or cloud-based computer processing system in one or more of a back-office server or a plurality of servers remote from a train, and providing one or more distributed, edge-based computer processing systems on-board one or more locomotives of the train, wherein each of the distributed computer processing systems is communicatively connected to the centralized computer processing system. The method may further include receiving, at data acquisition hub 312 communicatively connected to one or more of databases and a plurality of sensors associated with one or more locomotives or other components of a train, real-time and historical configuration, structural, and operational data in association with inputs derived from real time and historical contextual data relating to a plurality of trains operating under a variety of different conditions for use as training data. The method may still further include creating, using a centralized virtual system modeling engine included in the centralized computer processing system, one or more centralized models of one or more actual train control systems in operation on-board the one of more locomotives of the train based at least in part on data received from the data acquisition hub, wherein a first one of the centralized models is utilized in a process of generating a first set of output control commands for a first train control scenario implemented by an energy management system associated with the one or more locomotives, and creating, using one or more distributed virtual system modeling engines included in the one or more distributed computer processing systems, one or more edge-based models of one or more actual train control systems in operation on-board the one or more locomotives of the train based at least in part on data received from the data acquisition hub, wherein a first one of the edge-based models is utilized in a process of generating a second set of output control commands for a second train control scenario implemented by the energy management system associated with the one or more locomotives.

A machine learning engine included in at least one of the centralized and distributed computer processing systems may receive the training data from the data acquisition hub, receive the first centralized model from the centralized virtual system modeling engine, receive the first edge-based model from one of the distributed virtual system modeling engines, compare the first set of output control commands generated by the first centralized model for the first train control scenario and the second set of output control commands generated by the first edge-based model for the second train control scenario, and train a learning system using the training data to enable the machine learning engine to safely mitigate a divergence discovered between the first and second sets of output control commands using a learning function including at least one learning parameter. The machine learning engine may train the learning system by providing the training data as an input to the learning function, the learning function being configured to use the at least one learning parameter to generate an output based on the input, causing the learning function to generate the output based on the input, comparing the output to one or more of the first and second sets of output control commands to determine a difference between the output and the one or more of the first and second sets of output control commands, and modifying the at least one learning parameter and the output of the learning function to decrease the difference responsive to the difference being greater than a threshold difference and based at least in part on actual real time and historical information on in-train forces and train operational characteristics acquired from a plurality of trains operating under a variety of different conditions. The method may also include adjusting one or more of throttle requests, dynamic braking requests, and pneumatic braking requests for the one or more locomotives of the train using an energy management system associated with the one or more locomotives of the train, wherein the adjusting is based at least in part on the modified output of the learning function used by the learning system which has been trained by the machine learning engine.

As discussed above, the virtual system model may be periodically calibrated and synchronized with "real-time" sensor data outputs so that the virtual system model provides data output values that are consistent with the actual "real-time" values received from the sensor output signals. Unlike conventional systems that use virtual system models primarily for system design and implementation purposes (i.e., offline simulation and facility planning), the virtual system train control models or other virtual computer system models described herein may be updated and calibrated with the real-time system operational data to provide better predictive output values. A divergence between the real-time sensor output values and the predicted output values may generate either an alarm condition for the values in question and/or a calibration request that is sent to a calibration engine 334.

The analytics engine 318 and virtual system modeling engine 324 may be configured to implement pattern/sequence recognition into a real-time decision loop that, e.g., is enabled by machine learning. The types of machine learning implemented by the various engines of analytics server 316 may include various approaches to learning and pattern recognition. The machine learning may include the implementation of associative memory, which allows storage, discovery, and retrieval of learned associations between extremely large numbers of attributes in real time. At a basic level, an associative memory stores information about how attributes and their respective features occur together. The predictive power of the associative memory technology comes from its ability to interpret and analyze these co-occurrences and to produce various metrics. Associative memory is built through "experiential" learning in which each newly observed state is accumulated in the associative memory as a basis for interpreting future events. Thus, by observing normal system operation over time, and the normal predicted system operation over time, the associative memory is able to learn normal patterns as a basis for identifying non-normal behavior and appropriate responses, and to associate patterns with particular outcomes, contexts or responses. The analytics engine 318 is also better able to understand component mean time to failure rates through observation and system availability characteristics. This technology in combination with the virtual system model can present a novel way to digest and comprehend alarms in a manageable and coherent way.

The machine learning algorithms assist in uncovering the patterns and sequencing of alarms to help pinpoint the location and cause of any actual or impending failures of physical systems or computer systems. Typically, responding to the types of alarms that may be encountered when operating a train is done manually by experts who have gained familiarity with the system through years of experience. However, at times, the amount of information is so great that an individual cannot respond fast enough or does not have the necessary expertise. An "intelligent" system employing machine learning algorithms that observe human operator actions and recommend possible responses could improve train operational safety by supporting an existing operator, or even managing the various train control systems autonomously. Current simulation approaches for maintaining transient stability and synchronization between the various train control systems may involve traditional numerical techniques that typically do not test all possible scenarios. The problem is further complicated as the numbers of components and pathways increase. Through the application of the machine learning algorithms and virtual system modeling according to various embodiments of this disclosure, by observing simulations of various outcomes determined by different train control inputs and operational parameters, and by comparing them to actual system responses, it may be possible to improve the simulation process, thereby improving the overall design of future train control systems.

The virtual system model database 326, as well as databases 330 and 332, can be configured to store one or more virtual system models, virtual simulation models, and real-time data values, each customized to a particular system being monitored by the analytics server 316. Thus, the analytics server 316 can be utilized to monitor more than one train control system or other computer system associated with the train at a time. As depicted herein, the databases 326, 330, and 332 can be hosted on the analytics server 316 and communicatively interfaced with the analytics engine 318. In other embodiments, databases 326, 330, and 332 can be hosted on one or more separate database servers (not shown) that are communicatively connected to the analytics server 316 in a manner that allows the virtual system modeling engine 324 and analytics engine 318 to access the databases as needed. In one embodiment, the client 328 may modify the virtual system model stored on the virtual system model database 326 by using a virtual system model development interface including well-known modeling tools that are separate from the other network interfaces. For example, dedicated software applications that run in conjunction with the network interface may allow a client 328 to create or modify the virtual system models.

The client 328 may utilize a variety of network interfaces (e.g., web browsers) to access, configure, and modify the sensors (e.g., configuration files, etc.), analytics engine 318 (e.g., configuration files, analytics logic, etc.), calibration parameters (e.g., configuration files, calibration logic, etc.), virtual system modeling engine 324 (e.g., configuration files, simulation parameters, etc.) and virtual system models of the various train control systems under management (e.g., virtual system model operating parameters and configuration files). Correspondingly, data from those various components of the monitored system 302 can be displayed on a client 328 display panel for viewing by a system administrator or equivalent. As described above, analytics server 316 may be configured to synchronize and/or calibrate the various train control systems and subsystems in the physical world with virtual and/or simulated models and report, e.g., via visual, real-time display, deviations between the two as well as system health, alarm conditions, predicted failures, etc. In the physical world, sensors 304, 306, 308 produce real-time data for the various train control processes and equipment that make up the monitored system 302. In the virtual world, simulations generated by the virtual system modeling engine 324 may provide predicted values, which are correlated and synchronized with the real-time data. The real-time data can then be compared to the predicted values so that differences can be detected. The significance of these differences can be determined to characterize the health status of the various train control systems and subsystems. The health status can then be communicated to a user on-board the train or off-board at a remote control facility via alarms and indicators, as well as to client 328, e.g., via web pages.

In some embodiments, as discussed above, the analytics engine 318 may include a machine learning engine. The machine learning engine may include a train control strategy engine configured to receive training data from a data acquisition hub communicatively coupled to one or more sensors associated with one or more locomotives of a train. The training data may include real-time configuration, structural, and operational data, and may be communicated to the data acquisition hub and to the machine learning engine over wireless and/or wired networks. The training data may be relevant to train control operations, including a plurality of first input conditions and a plurality of first response maneuvers or first actions to be taken by an operator of the train associated with the first input conditions. The training data may include historical operational data acquired by various sensors associated with one or more locomotives of the train during one or more actual train runs. The training data may also include data indicative of specific actions taken by a train operator, or directly or indirectly resulting from actions taken by the train operator, under a large variety of operating conditions, and on trains with the same or different equipment, different operational characteristics, and different parameters. The machine learning engine and train control strategy engine may be configured to train a learning system using the training data to generate a second response maneuver or second action to be taken by the train operator based on a second input condition.

The response maneuvers generated by the machine learning engine may be integrated with and implemented by various train control systems and subsystems, such as the cab electronics system 238, and locomotive control system 237 shown in FIG. 2. The resultant controls performed by the various train control systems and subsystems based on outputs from the machine learning engine may improve the operation of trains that are being operated fully manually, semi-autonomously, or fully autonomously by enabling a shared mental model of train operator behavior between experienced human train operators or engineers, less experienced engineers, and autonomous or semi-autonomous train control systems. For example, a learning system according to various embodiments of this disclosure can be trained to learn how experienced human engineers respond to different inputs under various operating conditions, such as during the automatic implementation of train control commands, positive train control (PTC) algorithms, and automatic train operations (ATO), during extreme weather conditions, during emergency conditions caused by other train traffic or equipment failure on the train, while approaching and maneuvering in train yards, and under other train operating conditions. The trained learning system can then improve train control systems being operated by less experienced engineers, semi-autonomously, or fully autonomously to perform operational maneuvers in a manner consistent with how the experienced human engineers would respond under similar conditions. Unlike existing methods for maneuvering autonomous vehicles, such as by following a control law that optimizes a variable such as a throttle notch setting at the expense of performing other operational maneuvers that an experienced human engineer would readily understand, the machine learning engine disclosed herein may allow less experienced train engineers or autonomously-operated trains to execute maneuvers including selecting optimum control settings for a particular set of operational conditions that cannot be reduced to a control law. Train control systems that include a machine learning engine configured to encode real human engineer behavior into a train control strategy engine may enable less experienced train engineers, or semi-autonomously or fully autonomously operated trains to perform optimized train handling across different terrains, with different trains, and under different operating conditions. Additionally, such train control systems including machine learning engines may be configured to automate check rides required by current regulations, rather than requiring the presence of a manager accompanying the less experienced train engineers for the purpose of recertification. The models and learning functions generated by the machine learning engines may also reveal insights gleaned from training data accumulated while experienced train engineers are operating the train regarding why certain train control decisions were made for particular types of locomotives operating under particular conditions.

In some embodiments, the machine learning engine of analytics engine 318 may be configured to receive training data including a plurality of first input conditions and a plurality of first response maneuvers associated with the first input conditions. The first input conditions can represent conditions which, when applied to a train operating system or when perceived by a train engineer, lead to a particular response maneuver being performed. A "response maneuver" as used herein, refers to any action that may be taken by a human engineer or that may directly or indirectly result from an action taken by a human engineer. In particular, a response maneuver according to various implementations of this disclosure may include off-lining one or more locomotives when the locomotives reach a designated area of track. Virtual system modeling engine 324 may be configured to model designated areas of the track where the total tractive effort force or dynamic braking force applied by all of the locomotives in the train is less than the tractive effort force or dynamic braking force, respectively, provided by a subset of the available locomotives in the train for a time duration greater than the time needed to power down and power back up one or more unneeded locomotives or consists of locomotives in the train. The input conditions can include a state of a particular locomotive in a consist, a representation or state of an environment surrounding the consist, including behavior of other trains or locomotives on the same or interconnected tracks in the same geographical area, and commands, instructions, or other communications received from other entities.

The first input conditions can include an indication of a maneuver command. A maneuver command can be a command, instruction, or other information associated with a maneuver that a locomotive is expected, desired, or required to perform. Maneuver commands can vary in specificity and may include commands specific to an exact set of tracks along which the locomotive is required to travel to reach a general objective, specific throttle notch settings for one or more lead and/or trailing locomotives at different locations, under different loads or trip parameters, braking and dynamic braking commands, and other control settings to be implemented by the cab electronics system, throttle, dynamic braking and braking commands, and the locomotive control system.

The machine learning engine may be configured to train a learning system using the training data to generate a second response maneuver based on a second input condition. The machine learning engine can provide the training data as an input to the learning system, monitor an output of the learning system, and modify the learning system based on the output. The machine learning engine can compare the output to the plurality of first response maneuvers, determine a difference between the output and the plurality of first response maneuvers, and modify the learning system based on the difference between the output and the plurality of first response maneuvers. For example, the plurality of first response maneuvers may represent a goal or objective that the machine learning engine is configured to cause the learning system to match, by modifying characteristics of the learning system until the difference between the output and the plurality of first response maneuvers is less than a threshold difference. In some embodiments, the machine learning engine can be configured to modify characteristics of the learning system to minimize a cost function or optimize some other objective function or goal, such as reduced emissions, during a particular train trip or over a plurality of trips or time periods. The machine learning engine can group the training data into a first set of training data for executing a first learning protocol, and a second set of training data for executing a second learning protocol.

The learning system can include a learning function configured to associate the plurality of input conditions to the plurality of first response maneuvers, and the learning function can define characteristics, such as a plurality of parameters. The machine learning engine can be configured to modify the plurality of parameters to decrease the difference between the output of the learning system (e.g., the output of the learning function) and the plurality of first response maneuvers. Once trained, the learning system can be configured to receive the second input condition and apply the learning function to the second input condition to generate the second response maneuver. The machine learning engine may be configured to continually or periodically update the learning function of the learning system as more and more relevant real time data is acquired by data acquisition hub 312. In some embodiments, the learning system may include a neural network. The neural network can include a plurality of layers each including one or more nodes, such as a first layer (e.g., an input layer), a second layer (e.g., an output layer), and one or more hidden layers.

The neural network can include characteristics such weights and biases associated with computations that can be performed between nodes of layers. The machine learning engine can be configured to train the neural network by providing the first input conditions to the first layer of the neural network. The neural network can generate a plurality of first outputs based on the first input conditions, such as by executing computations between nodes of the layers. The machine learning engine can receive the plurality of first outputs, and modify a characteristic of the neural network to reduce a difference between the plurality of first outputs and the plurality of first response maneuvers.

In some embodiments, the learning system may include a classification engine, such as a support vector machine (SVM). The SVM can be configured to generate a mapping of first input conditions to first response maneuvers. For example, the machine learning engine may be configured to train the SVM to generate one or more rules configured to classify training pairs (e.g., each first input condition and its corresponding first response maneuver). The classification of training pairs can enable the mapping of first input conditions to first response maneuvers by classifying particular first response maneuvers as corresponding to particular first input conditions. Once trained, the learning system can generate the second response maneuver based on the second input condition by applying the mapping or classification to the second input condition.

Another exemplary classification engine that may be utilized in a learning system according to various implementations of this disclosure may include a decision tree based algorithm such as Random Forests® or Random Decision Forests. Decision trees may be used for classification, but also for regression problems. When training a dataset to classify a variable, the idea of a decision tree is to divide the data into smaller datasets based on a certain feature value until the target variables all fall under one category. To avoid overfitting, variations of decision tree classifiers such as a Random Forests® classifier or an AdaBoost classifier may be employed. A Random Forests® classifier fits a number of decision tree classifiers on various sub-samples of the dataset and uses averaging to improve the predictive accuracy and control over-fitting. The sub-sample sizes are always the same as the original input sample size but the samples of the original data frame are drawn with replacements (bootstrapping). An AdaBoost classifier begins by fitting a classifier on the original dataset and then fits additional copies of the classifier on the same dataset where the weights of incorrectly classified instances are adjusted such that subsequent classifier focus more on difficult cases. Yet another exemplary classification engine may include a Bayesian estimator such as a naïve Bayes classifier, which is a family of probabilistic classifiers based on applying Bayes theorem with strong (naïve) independence assumptions between the features. A naïve Bayes classifier may be trained by a family of algorithms based on a common principle, such as assuming that the value of a particular feature is independent of the value of any other feature, given the class variable. This type of classifier may also be trained effectively using supervised learning, which is a machine learning task of learning a function that maps an input to an output based on example input-output pairs. The learning function is inferred from labeled training data consisting of a set of training examples. Each example is a pair consisting of an input object (typically a vector) and a desired output value (also called a supervisory signal). A supervised learning algorithm analyzes the training data and produces an inferred function, which can be used for mapping new examples.

In some embodiments, the learning system may include a Markov decision process engine. The machine learning engine may be configured to train the Markov decision process engine to determine a policy based on the training data, the policy indicating, representing, or resembling how a particular locomotive would behave while controlled by an experienced human engineer in response to various input conditions. The machine learning engine can provide the first input conditions to the Markov decision process engine as a set or plurality of states (e.g., a set or plurality of finite states). The machine learning engine can provide the first response maneuvers to the Markov decision process as a set or plurality of actions (e.g., a set or plurality of finite actions). The machine learning engine can execute the Markov decision process engine to determine the policy that best represents the relationship between the first input conditions and first response maneuvers. It will be appreciated that in various embodiments, the learning system can include various other machine learning engines and algorithms, as well as combinations of machine learning engines and algorithms, that can be executed to determine a relationship between the plurality of first input conditions and the plurality of first response maneuvers and thus train the learning system.

In some implementations of this disclosure, train configuration and operational data may be provided to the machine learning engine over a 5G cellular radio frequency telecommunications network interconnecting multiple nodes of a distributed computer control system. But alternative embodiments of the present disclosure may be implemented over a variety of data communication network environments using software, hardware, or a combination of hardware and software to provide the distributed processing functions.

INDUSTRIAL APPLICABILITY

The disclosed system and method provides for the modeling of designated areas of track where one or more locomotives in a consist may be off-lined to reduce fuel consumption while still meeting the required tractive force and dynamic braking for the train enable operation of the various power sources throughout the consist in ways that may improve overall fuel economy, reduce emissions, increase engine life, and reduce noise. The disclosed system and method may also facilitate efficient and effective compliance with a wide range of power demands and tractive efforts called upon under a wide variety of conditions experienced by the consist.

A method of controlling one or more locomotives in a train according to various implementations of this disclosure may include using machine learning to model and classify sections of track along which the train is traveling according to the tractive power needs for the train traversing each section of track as a function of an effective weight profile of the train in the section and an effective friction profile of the section of track. The method may include acquiring real-time and historical data relating to grade vs. location for the section of track and corresponding structural information on each of the one or more locomotives and non-powered rail cars of the train traveling over the section of track, and calculating the effective weight profile of the train in the section of track from the acquired data. The structural information for each locomotive may include the total weight of the locomotive, with different levels of fuel, an effective frontal area of the locomotive, which determines how much wind resistance the locomotive encounters while traveling at different speeds, and the number of axles the locomotive has, which is a factor in how much rolling resistance and other frictional resistance the locomotive will encounter when traveling over a particular section of track. The method may further include acquiring real-time and historical data relating to speed of the train vs. location for the section of track and corresponding structural information on each of the one or more locomotives and non-powered rail cars of the train traveling over the section of track, and calculating the effective friction profile of the train in the section of track from the acquired data. The method may still further include acquiring real-time and historical data relating to the tractive effort force vs. speed and dynamic braking force for each of the one or more locomotives traveling over the section of track, and calculating the effective power availability profile of the train in the section of track from the acquired data. The method includes combining the results of the effective weight profile, the effective friction profile, and the effective power availability profile, and using the combined data to train a virtual system modeling engine to model designated areas of the track where the total tractive effort force or dynamic braking force applied by all of the locomotives in the train is less than the tractive effort force or dynamic braking force, respectively, provided by a subset of the available locomotives in the train for a time duration greater than the time needed to power down and power back up one or more unneeded locomotives or consists of locomotives in the train. In other words, models produced by the virtual system modeling engine simulate designated areas of track where one or more locomotives or consists of locomotives in a particular train are not needed to produce the total tractive effort required to move the particular train with certain real-time operational and structural characteristics present during a certain period of time at a desired speed over the designated area of track, or one or more locomotives or consists of locomotives in the train are not needed to slow the train and generate a certain amount of power needed through dynamic braking during the period of time over the designated area of track. The method still further includes storing one or more virtual system models simulated by the virtual system modeling engine in a model database, wherein each of the one or more virtual system models includes a mapping between different combinations of the real-time and historical data and corresponding designated areas of the track, and acting, using an energy management system associated with one or more locomotives of the train, to isolate the one or more unneeded locomotives or consists of locomotives for the time duration based at least in part on one of the virtual system models. In an "isolation" mode, a locomotive may essentially take itself electrically off-line as a result of the command received from a lead control computer.

Isolation or off-lining of a locomotive may require activation of a physical switch to put the locomotive into isolation mode. Physically switching a locomotive into isolation mode results in physical changes to circuit pathways, and implementation of certain operational characteristics that cannot be varied as long as the locomotive remains physically in isolation mode. This activation of a physical switch may not provide a desired flexibility in selectively designating operational settings for each of the locomotives in the consist in order to achieve the particular performance goal for the consist. In accordance with various alternative implementations of the present disclosure, the effects of the selectively designated operational settings may be implemented for a locomotive through the use of control signals without physically switching the locomotive to an isolation mode or completely off-lining the locomotive. As a result, an isolation mode switch on the locomotive may be left in a "run" position. One or more of the effects that would have been implemented by switching the locomotive into isolation mode may be achieved through the use of control signals that simulate isolation rather than physically switching the locomotive to an isolation mode.

When a trailing locomotive is taken off-line, the locomotive may no longer respond to throttle or power commands from a lead control computer, and may instead receive start-up and shut-down commands from an Automatic Engine Start-Stop (AESS) system on the trailing locomotive. In various non-limiting implementations, the AESS system may include hardware and software solutions for monitoring critical operating parameters during idle operation on the trailing locomotive such as the electrical charge in batteries, air pressure in brake line reservoirs, and engine temperatures, and receiving input from train-lines (e.g., MU lines), other sensors and other systems to determine the state of the locomotive. Based on at least these monitored local conditions, the AESS system may safely and effectively start-up and shut-down the trailing locomotive completely independently from any command received from a lead computer, as independently determined by the AESS system to maintain desired local conditions on the isolated locomotive. The transfer of electrical power over a common electrical power bus running between a lead locomotive and trailing locomotives in some exemplary embodiments, which electrical power is maintained at or above a set minimum voltage, may also enable an isolated locomotive to continue to draw all of the auxiliary power it may need from the electrical power bus. Additional effects of the operational characteristics that would be implemented on a locomotive in isolated mode may include differences in the way active faults are treated. Certain detected active faults may not be considered to be important enough to report when a particular locomotive is in isolated mode. Alarm indicators for active faults in a trailing locomotive that would normally be conveyed to an operator in the lead locomotive may not be transmitted while the trailing locomotive is physically isolated. As one non-limiting example, an active fault indicative of the failure of a locomotive to respond to a throttle command would most likely be ignored when the locomotive is in isolated mode. A physically isolated locomotive may also treat engine speed-up and slow-down requests differently, or may ignore such requests completely, as compared to a locomotive in run mode.

Off-lining of a locomotive in accordance with various implementations of this disclosure may enable the selective designation of operational settings for the locomotive that will best achieve the particular performance goals for the consist. The effects of the selectively designated operational settings may be implemented for the locomotive through the use of control signals without actually physically switching the locomotive completely off-line. In various exemplary implementations, only certain effects characteristic of a physically isolated locomotive may be implemented. One example may include rendering the locomotive unresponsive to throttle/load requests transmitted over the MU cable, while still providing notification of active faults detected on the locomotive that would normally be ignored when the locomotive is off-line. Another example may include rendering the locomotive only unresponsive to throttle/load requests that fall within a specific range.

Undesired emissions may also be minimized by powering a minimal set of locomotives. For example, emissions produced by a train with several locomotives or locomotive consists may be reduced by powering a minimal set of locomotives at a higher power setting while putting the remaining locomotives into simulated off-line mode, idle, un-powered standby, or an automatic engine start-stop (AESS) mode. This is due, in part, because at lower power settings such as traditional throttle notch settings 1-3, exhaust emissions after-treatment devices (e.g., catalytic converters) located on the locomotives may be at temperatures below which these systems' operations are optimal. Therefore, using the minimum number of locomotives or locomotive consists to achieve mission objectives, while operating at high power settings may allow the exhaust emission treatment devices to operate at optimal temperatures for further reducing emissions.

The train load may be estimated based on information such as is typically disclosed in a train makeup docket. The train makeup docket may be contained in the control computer associated with a particular locomotive, and may include such information as the number of cars, weight of the cars, content of the cars, and age of the cars. In alternative implementations the train load may be estimated using historical data, such as but not limited to prior train missions making the same trip, and similar train car configurations. With respect to engines used in other applications, identifying a mission time and/or duration for the diesel power system may be equated to defining the mission time within which the engine configuration is expected to accomplish the mission. A determination is made about a minimum total amount of power required based on the train load. The locomotive is selected to satisfy the minimum required power while yielding improved fuel efficiency and/or minimized emission output. The locomotive may be selected based on a type of locomotive (based on its engine) needed and/or a number of locomotives (based on a number of engines) needed.

Towards this end, a trip mission time determinator may be used to determine the mission time, based on information such as weather conditions and track conditions. The locomotive makeup may be based on types of locomotives needed, such as based on power output, and/or a minimum number of locomotives needed. For example, based on the available locomotives, a selection is made of those locomotives that just meet the total power required. As an example, if ten locomotives are available, a determination of the power output from each locomotive may be made. Based on this information, the fewest number and type of locomotives needed to meet the total power requirements may be selected. For example the locomotives may have different horse power (HP) ratings or starting tractive effort (TE) ratings. In addition to the total power required, the distribution of power and type of power in the train can be determined. For example, to limit the maximum coupler forces on heavy trains, the locomotives may be distributed within the train. Another consideration is the capabilities of any particular locomotive based on its age, model type, or other factors.

In an alternative implementation, the selection of locomotives may not be based solely on reducing a number of locomotives used in a train. For example, if the total power requirement is minimally met by five of the available locomotives when compared to also meeting the power requirement by the use of three of the available locomotives, the five locomotives may be used instead of the three. In view of these options, a minimum number of locomotives may be selected from a sequential (and random) set of available locomotives. Such an approach may be used when the train is already compiled and a decision is being made at run time and/or during a mission wherein the remaining locomotives are not used to power the train, or are placed into simulated isolation. While compiling the train, if the train requires backup power, an incremental locomotive, or locomotives, may be added. However this additional locomotive may be placed into simulated isolation to minimize fuel use, emissions output, and power variation, but may be used to provide backup power in case an operating locomotive fails, and/or to provide additional power to accomplish the trip within an established mission time. The isolated locomotive may be put into an AESS mode to minimize fuel use while having the locomotive be available when needed. In various implementations, if a backup, or isolated, locomotive is provided, its dimensions, such as weight, may be taken into consideration when determining the train load.

In certain implementations, the total mission run may be broken into a plurality of sections, or segments. Based on the amount of time taken to complete any segment, the backup power, provided by an off-line locomotive, may be made available in case incremental power is needed to meet the trip mission objective. The off-line locomotive may be utilized for a specific trip segment to get the train back on schedule and then switched off for subsequent segments. Thus, in operation, a lead locomotive may put one or more trailing locomotives into a simulated off-line mode until the power is needed. This may be accomplished by use of wired or wireless modems or communications from the operator, usually on the lead locomotive, to the isolated locomotive. In various implementations, the initial setup of the locomotives, based on train load and mission time, may be updated, and adjustments to the number and type of powered locomotives may be made.

One or more control computers may be further configured to receive inputs from various engine sensors, electrical sensors, ATS sensors, and locomotive sensors, process the data, and trigger the engine actuators, generator electrical power control actuators, traction motor actuators, ATS actuators, and locomotive actuators in response to the processed input data. The one or more control computers may be configured to take these actions based on instructions, look-up tables, one or more maps, or programmed code or algorithms corresponding to one or more routines. For example, a control computer may be configured to determine locomotive power outputs and brake settings, engine operating parameters, and the precise levels of electrical power output expected from each generator on each locomotive based on the locomotive operating conditions and current environmental conditions for each locomotive.

In one example, a control computer may be configured to determine precise electrical power output requirements for each locomotive based on the current voltage and/or current in a common electrical power bus running between the locomotives in a consist, individual engine operating conditions, generator electrical power output capabilities, traction motor electrical power requirements, age of the equipment, and operator preferences. Individual locomotives and/or one or more consists of locomotives in a train may be operated in accordance with particular power duty cycles that specify the time spent at each power level or range of total power outputs as a fraction of total time of operation. In various implementations, the diesel engines that constitute the prime mover power sources, and in some cases, auxiliary power sources, may be most efficient and achieve best possible brake specific fuel consumption at or near full power. Accordingly, for these implementations, a control computer may provide commands for electrical power output from each of the power sources that will result in the engines on each locomotive operating close to full power for as large a portion of total operating time of each engine as possible. Based on possible differences between the time in a particular power duty cycle and a reference duty cycle (such as an EPA duty cycle), one or more control computers may reconfigure locomotive operational parameters. For example, based on the differences, a particular control computer may be configured to readjust parameters previously set during planning stages. These parameters may include electrical power output requirements for each alternator, electrical power consumption or draw by each traction motor, fuel injection settings for each engine, ignition timing, and other engine operating parameters and exhaust aftertreatment parameters. In one example, as an actual duty cycle for one or more of the locomotives starts deviating from a reference duty cycle, thereby possibly leading to increased exhaust emissions or reduced fuel efficiency, a control computer may provide instructions to readjust electrical power output requirements for one or more locomotives for a trip that imposes fuel economy and exhaust emissions as constraints. Any one or more of the control computers may be configured to customize a particular portion of a trip along a designated area of track based on network data and/or non-network data received from one or more of an operator, remote dispatch center, onboard sensors including engine operating sensors, electrical sensors, and locomotive sensors, and wayside sensors including hot box detectors, impact detectors, and hot wheel detectors.

In various alternative implementations, operator input may include a total wattage power output goal, a fuel efficiency goal, an emissions level goal, a tractive power goal, or a performance goal for each of the locomotives or for the consist as a whole. Any one or more of the control computers may be configured to determine the electrical power output desired from each of the power sources on each of the locomotives at any particular time, or over any particular period of time, in order to improve fuel efficiency for the entire consist, reduce emissions, re-allocate load requirements, or otherwise vary the power outputs of each locomotive as a function of operating parameters, constraints, and objectives. This determination may be made by calculating from one or more algorithms, or by reference to a look-up table, one or more maps, or other data obtained over a network or stored in memory.

The transfer of electrical power from one power generating locomotive to another in the consist along a common electrical power bus running through all of the locomotives may provide flexibility in the operation of the various power sources that would not be available when simply transferring control signals between the locomotives. The disclosed power sharing system and ability to selectively off-line particular locomotives along designated areas of track identified by a machine learning virtual system modeling engine may be applicable to any number of vehicles and/or different types of vehicles having electrical power drive in various arrangements. For example, the consist could include additional or fewer locomotives, passenger cars, freight cars, tanker cars, or other rail or non-rail vehicles having electrical power drive. The combination of power sharing over a common electrical power bus may allow implementations that would not be possible otherwise. The effects of reduced fuel consumption by off-lining certain locomotives may be partially offset by drawing more electrical power from a common electrical power bus in order to provide the same torque output at the traction motors for one or more off-lined locomotives. This may in turn result in increased fuel consumption by another locomotive in the consist. However, a determination may be made by a controller on a locomotive that the prime mover power source on the locomotive to be off-lined or even placed into simulated isolation is less fuel efficient in a particular power range or under other circumstances than another locomotive in the consist. In another alternative implementation, simulated isolation of a locomotive may be implemented by continuing to respond to throttle/load requests received over a MU cable as long as those throttle requests are less than a particular notch setting. The controller implementing simulated isolation for a locomotive may interpret throttle notch settings above a designated setting as requiring more electrical power to be provided to the simulated isolated locomotive from the common electrical power bus. As a result, the prime mover engine on the locomotive in simulated isolation may not be requested to output power above a designated amount. Other alternative implementations of simulated isolation of a locomotive may be characterized by treating any active faults on the locomotive exactly the same as a locomotive that is not isolated.

It will be apparent to those skilled in the art that various modifications and variations can be made to the disclosed simulated isolation system. Other implementation will be apparent to those skilled in the art from consideration of the specification and practice of the disclosed methods. It is intended that the specification and examples be considered as exemplary only, with a true scope being indicated by the following claims and their equivalents.

What is claimed is:

1. A method of controlling one or more locomotives in a train using a machine learning engine and a virtual system modeling engine to model and classify sections of track along which the train is traveling, the method comprising:

acquiring a first set of real-time and historical data relating to grade vs. location for a section of track and a first set of corresponding structural information on each of the one or more locomotives and on non-powered rail cars of the train traveling over the section of track, and calculating an effective weight profile for the train in the section of track using the first set of real-time and historical data and the first set of corresponding structural information;

acquiring a second set of real-time and historical data relating to speed of the train vs. location for the section of track and a second set of corresponding structural information on each of the one or more locomotives and on non-powered rail cars of the train traveling over the section of track, and calculating an effective friction profile for the train in the section of track using the second set of real-time and historical data and the second set of corresponding structural information;

acquiring a third set of real-time and historical data relating to the tractive effort force vs. speed and dynamic braking force for each of the one or more locomotives traveling over the section of track, and calculating an effective power availability profile of the train in the section of track using the third set of real-time and historical data;

using the acquired data and information to train the virtual system modeling engine using the machine learning engine to create an off-lining model, the off-lining model predicting designated areas of the track where the total tractive effort force or dynamic braking force applied by the locomotives in the train will be less than the tractive effort force or dynamic braking force, respectively, that can be provided by a subset of the locomotives in the train for a time duration, the subset excluding one or more unneeded locomotives or consists of locomotives in the train, the time duration being greater than the time needed to power down and power back up the one or more of the unneeded locomotives or consists of locomotives;

storing one or more virtual system models simulated by the virtual system modeling engine in a model database, the one or more virtual system models including the off-lining model, wherein each of the one or more virtual system models includes a mapping between different combinations of the first, second, and third sets of real-time and historical data and corresponding designated areas of the track; and acting, using an energy management system associated with one or more locomotives of the train, to off-line the one or more unneeded locomotives or consists of locomotives for the time duration based at least in part on the off-lining model of the virtual system models.

2. The method of claim 1, wherein the structural information on each of the one or more locomotives and non-powered rail cars of the train includes one or more of the weight, the length, the effective frontal area, and the number of axles of each of the locomotives and rail cars.

3. The method of claim 1, wherein the virtual system modeling engine generates predicted data for the designated areas of track and the machine learning engine determines a difference between the predicted data and actual real-time data indicative of an error in the modeling of designated areas of track, and modifies at least one learning parameter used with a learning function that relates the real-time and historical data to the designated areas of track modeled by the virtual system modeling engine to decrease the difference responsive to the difference being greater than a threshold difference.

4. The method of claim 1, wherein the one or more virtual system models stored in the model database are periodically calibrated and synchronized with real-time data received from sensor data outputs so that the virtual system model provides data output values that are consistent with the actual real-time values received from the sensor output signals.

5. The method of claim 1, wherein the modeling of designated areas of track includes identifying one or more first sections within the designated area where the number of unneeded locomotives or consists of locomotives is a first value, and identifying one or more second sections within the designated area where the number of unneeded locomotives or consists of locomotives is a second value that is greater than the first value.

6. The method of claim 1, wherein the off-lining model predicts that an amount of fuel saved will be worth more than an amount of speed lost by operating the train with only the subset of the locomotives across one of the designated areas of the track during the duration.

7. The method of claim 5, wherein the one or more second sections comprise sections of track with one or more of a lower frictional resistance to the tractive effort force of the locomotives of the train or a lower demand for the dynamic braking force of the locomotives of the train.

8. The method of claim 5, wherein the modeling of designated areas of track includes identifying one or more third sections within the designated area adjacent to at least one of the first sections or one of the second sections where the number of unneeded locomotives or consists of locomotives within the one or more third sections is less than the number of unneeded locomotives or consists of locomotives in the at least one of the first sections or second sections, but the same number of unneeded locomotives or consists of locomotives as in the at least one of the first sections or second sections is off-lined in the one or more third sections by the energy management system based on a model indicating that the resultant fuel savings from maintaining the same number of off-line locomotives in the one or more third sections as the number of unneeded locomotives or consists in the at least one of the first sections or second sections outweighs the negative impact from maintaining a needed locomotive or consist off-line in the one or more third sections.

9. The method of claim 1, wherein each of the virtual system models may be updated and calibrated with real-time system operational data to provide better predictive output values.

10. A train control system including a machine learning engine and a virtual system modeling engine, wherein the train control system is configured to use machine learning for controlling one or more locomotives in a train by modeling and classifying sections of track along which the train is traveling, the train control system comprising:

an effective weight module programmed to acquire a first set of real-time and historical data relating to grade vs. location for the section of track and a first set of corresponding structural information on each of the one or more locomotives and on non-powered rail cars of the train traveling over the section of track, and calculate an effective weight profile of the train in the section of track using the first set of real-time and historical data and the first set of corresponding structural information;

an effective friction module programmed to acquire a second set of real-time and historical data relating to speed of the train vs. location for the section of track and a second set of corresponding structural information on each of the one or more locomotives and on non-powered rail cars of the train traveling over the section of track, and calculate an effective friction profile of the train in the section of track using the second set of real-time and historical data and the second set of corresponding structural information;

a power availability module programmed to acquire a third set of real-time and historical data relating to a tractive effort force vs. speed and a dynamic braking force for each of the one or more locomotives traveling over the section of track, and calculate an effective power availability profile of the train in the section of track using the third set of real-time and historical data;

the virtual system modeling engine being programmed to use the acquired data and information and the machine learning engine to train one or more off-lining models to recognize designated areas of the track where the total tractive effort force or dynamic braking force applied by the locomotives in the train will be less than the tractive effort force or dynamic braking force, respectively, that can be provided by a subset of the available locomotives in the train for a time duration, the subset excluding one or more unneeded locomotives or consists of locomotives in the train, the time duration being greater than the time needed to power down and power back up the one or more unneeded locomotives or consists of locomotives;

memory for storing the one or more off-lining models simulated by the virtual system modeling engine, wherein each of the one or more off-lining models includes a mapping between different combinations of the first, second, and third sets of real-time and historical data and corresponding designated areas of the track; and an energy management system associated with one or more locomotives of the train and configured to off-line the one or more unneeded locomotives or consists of locomotives for the time duration based at least in part on one of the off-lining models.

11. The train control system of claim 10 wherein the structural information on each of the one or more locomotives and non-powered rail cars of the train includes one or more of the weight, the length, the effective frontal area, and the number of axles of each of the locomotives and rail cars.

12. The train control system of claim 10, wherein the virtual system modeling engine generates predicted data for the designated areas of track and the machine learning engine determines a difference between the predicted data and actual real-time data indicative of an error in the modeling of designated areas of track, and modifies at least one learning parameter used with a learning function that relates the real-time and historical data to the designated areas of track modeled by the virtual system modeling engine to decrease the difference responsive to the difference being greater than a threshold difference.

13. The train control system of claim 10, wherein the one or more virtual system models stored in the model database are periodically calibrated and synchronized with real-time data received from sensor data outputs so that the virtual system model provides data output values that are consistent with the actual real-time values received from the sensor output signals.

14. The train control system of claim 10, wherein the modeling of designated areas of track includes identifying one or more first sections within the designated area where the number of unneeded locomotives or consists of locomotives is a first value, and identifying one or more second sections within the designated area where the number of unneeded locomotives or consists of locomotives is a second value that is greater than the first value.

15. The train control system of claim 10, wherein the off-lining model predicts that an amount of fuel saved will be worth more than an amount of speed lost by operating the train with only the subset of the locomotives across one of the designated areas of the track during the duration.

16. The train control system of claim 14, wherein the one or more second sections comprise sections of track with one or more of a lower frictional resistance to the tractive effort force of the locomotives of the train or a lower demand for the dynamic braking force of the locomotives of the train.

17. The train control system of claim 14, wherein the modeling of designated areas of track includes identifying one or more third sections within the designated area adjacent to at least one of the first sections or one of the second sections where the number of unneeded locomotives or consists of locomotives within the one or more third sections is less than the number of unneeded locomotives or consists of locomotives in the at least one of the first sections or second sections, but the same number of unneeded locomotives or consists of locomotives as in the at least one of the first sections or second sections is off-lined in the one or more third sections by the energy management system based on a model indicating that the resultant fuel savings from maintaining the same number of off-line locomotives in the one or more third sections as the number of unneeded locomotives or consists in the at least one of the first sections or second sections outweighs the negative impact from maintaining a needed locomotive or consist off-line in the one or more third sections.

18. A locomotive control system, comprising:
a machine learning engine configured to receive real-time and historical data for use as training data for a virtual system modeling engine configured to model and classify sections of track along which one or more locomotives of a train are traveling, wherein
the machine learning engine comprising:
an effective weight module programmed to acquire a first set of real-time and historical data relating to grade vs. location for each of the sections of track and a first set of corresponding structural information on each of the one or more locomotives and on non-powered rail cars of the train traveling over each section of track, and calculate the effective weight profile of the train in each section of track using the first set of real-time and historical data and the first set of corresponding structural information;
an effective friction module programmed to acquire a second set of real-time and historical data relating to speed of the train vs. location for each of the sections of track and a second set of corresponding structural information on each of the one or more locomotives and on non-powered rail cars of the train traveling over each section of track, and calculate the effective friction profile of the train in each section of track using the second set of real-time and historical data and the second set of corresponding structural information; and
a power availability module programmed to acquire a third set of real-time and historical data relating to a tractive effort force vs. speed and a dynamic braking force for each of the one or more locomotives traveling over each section of track, and calculate the effective power availability profile of the train in each section of track using the third set of real-time and historical data; and
the virtual system modeling engine being programmed to use the acquired data and information to generate one or more virtual system models, the one or more virtual system models including an off-lining model identifying designated areas of the track where the total tractive effort force or dynamic braking force applied by the locomotives in the train will be less than a tractive effort force or a dynamic braking force, respectively, that can be provided by a subset of the locomotives in the train for a time duration, the subset excluding one or more unneeded locomotives in the train, the time duration being greater than the time needed to power down and power back up the one or more of the unneeded locomotives or consists of locomotives;
memory for storing the one or more virtual system models simulated by the virtual system modeling engine, wherein each of the one or more virtual system models includes a mapping between different combinations of the first, second, and third sets of real-time and historical data and corresponding designated areas of the track; and
an energy management system associated with one or more locomotives of the train and configured to off-line the one or more unneeded locomotives or consists of locomotives for the time duration based at least in part on the off-lining model of the virtual system models.

19. The locomotive control system of claim 18, wherein the modeling of designated areas of track includes identifying one or more first sections within the designated area where the number of unneeded locomotives or consists of locomotives is a first value, and identifying one or more second sections within the designated area where the number of unneeded locomotives or consists of locomotives is a second value that is greater than the first value.

20. The locomotive control system of claim 19, wherein the modeling of designated areas of track includes identifying one or more third sections within the designated area adjacent to at least one of the first sections or one of the second sections where the number of unneeded locomotives or consists of locomotives within the one or more third sections is less than the number of unneeded locomotives or consists of locomotives in the at least one of the first sections or second sections, but the same number of unneeded locomotives or consists of locomotives as in the at least one of the first sections or second sections is off-lined in the one or more third sections by the energy management system based on a model indicating that the resultant fuel savings from maintaining the same number of off-line locomotives in the one or more third sections as the number of unneeded locomotives or consists in the at least one of the first sections or second sections outweighs the negative impact from maintaining a needed locomotive or consist off-line in the one or more third sections.

* * * * *